(12) United States Patent
Tanaka

(10) Patent No.: US 11,501,565 B2
(45) Date of Patent: Nov. 15, 2022

(54) PASSENGER MANAGEMENT DEVICE, PASSENGER INFORMATION PROCESSING DEVICE, PASSENGER MANAGEMENT METHOD, AND PROGRAM

(71) Applicant: NEC CORPORATION, Tokyo (JP)

(72) Inventor: Yukihiro Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 16/822,701

(22) Filed: Mar. 18, 2020

(65) Prior Publication Data

US 2020/0302158 A1 Sep. 24, 2020

(30) Foreign Application Priority Data

Mar. 22, 2019 (JP) .............................. JP2019-054144

(51) Int. Cl.
*G06K 9/00* (2022.01)
*G06V 40/16* (2022.01)
*G06Q 50/30* (2012.01)
*G06Q 20/40* (2012.01)
(Continued)

(52) U.S. Cl.
CPC ......... *G06V 40/172* (2022.01); *G06Q 20/102* (2013.01); *G06Q 20/40145* (2013.01); *G06Q 50/30* (2013.01); *G06V 20/593* (2022.01)

(58) Field of Classification Search
CPC .. G06Q 10/02; G06Q 20/40145; G06Q 50/30; G06Q 20/102; G06V 10/00; G06V 10/10; G06V 10/12; G06V 10/17; G06V 10/20; G06V 10/72; G06V 10/74; G06V 10/77; G06V 10/7784; G06V 10/7788; G06V 10/7792; G06V 10/98; G06V 10/987; G06V 30/00; G06V 30/133;
(Continued)

(56) References Cited

U.S. PATENT DOCUMENTS

2019/0114563 A1* 4/2019 Yukimoto ................ G07C 9/00

FOREIGN PATENT DOCUMENTS

JP 2007-072781 A 3/2007
JP 2013-073396 A 4/2013

* cited by examiner

*Primary Examiner* — Huy C Ho
(74) *Attorney, Agent, or Firm* — Sughrue Mion, PLLC

(57) ABSTRACT

To improve convenience of a passenger using a paid seat. An image transmission unit transmits a plurality of images generated by a first camera to a passenger information processing device. The passenger information processing device performs person specifying processing using the image. A processing result acquisition unit acquires a processing result by the passenger information processing device. This processing result is obtained by associating person specifying information that specifies a person included in the image with attribute information of the passenger. A getting-on station management unit generates getting-on station information using the person specifying information and the attribute information associated with the person specifying information. A getting-off station management unit generates getting-off station information using the person specifying information and the attribute information associated with the person specifying information. The getting-on station information and the getting-off station information are stored in a first storage unit in association with the person specifying information of the passenger.

17 Claims, 20 Drawing Sheets

(51) Int. Cl.
*G06Q 20/10* (2012.01)
*G06V 20/59* (2022.01)

(58) Field of Classification Search
CPC .... G06V 30/127; G06V 30/12; G06V 30/142;
G06V 40/10; G06V 40/16; G06V 40/172;
G06V 20/593
USPC ......................................................... 382/118
See application file for complete search history.

| PERSON SPECIFYING INFORMATION | .... |
|---|---|
| SEAT INFORMATION | .... |
| GETTING-ON STATION | .... |
| GETTING-OFF STATION | .... |

| GETTING-ON DATE AND TIME | .... |
| SEAT INFORMATION | .... |
| GETTING-ON STATION | .... |
| GETTING-OFF STATION | .... |
| SETTLEMENT INFORMATION | SETTLED |

| PERSON SPECIFYING INFORMATION | .... |
|---|---|
| FEATURE AMOUNT | .... |
| SETTLEMENT MEANS INFORMATION | .... |

FIG. 17

| GETTING-ON DATE AND TIME | GETTING-OFF DATE AND TIME | SEAT INFORMATION | GETTING-ON STATION | GETTING-OFF STATION | SETTLEMENT INFORMATION |
|---|---|---|---|---|---|
| 13:40 ON JANUARY 31 | 14:10 ON JANUARY 31 | ... | A | B | UNSETTLED |
| 14:30 ON JANUARY 31 | 14:50 ON JANUARY 31 | ... | B | C | UNSETTLED |

| PERSON SPECIFYING INFORMATION | .... |
|---|---|
| FEATURE AMOUNT | .... |
| SETTLEMENT MEANS INFORMATION | .... |
| SCHEDULED GETTING-ON SECTION INFORMATION | .... |

PASSENGER MANAGEMENT DEVICE, PASSENGER INFORMATION PROCESSING DEVICE, PASSENGER MANAGEMENT METHOD, AND PROGRAM

BACKGROUND

Technical Field

The invention relates to a passenger management device, a passenger information processing device, a passenger management method, and a program.

Related Art

When a passenger uses a paid seat of a train, generally, the passenger needs to purchase a ticket for using the seat before getting on the train or pay a predetermined fare to a crew after getting on the train.

On the other hand, Japanese Unexamined Patent Publication No. 2007-72781 describes that authentication using a face image is performed to authenticate that a person seated on an airplane seat is the same as a checked-in person. Japanese Unexamined Patent Publication No. 2013-73396 describes that billing processing is performed when information indicating a train congestion degree is provided to a user.

SUMMARY

When a passenger uses a paid seat, the passenger needs to perform payment processing for the paid seat before getting on the train. In a case where there is not enough time until the departure time point of the train, the passenger needs to pay the crew a fare for the paid seat after getting on the train. As described above, there is room for improvement in convenience of the passenger using the paid seat.

An example of an object of the invention is to improve convenience of a passenger using a paid seat.

In one embodiment, there is provided a passenger management device installed in a train including an image transmission unit that transmits information on a portion including at least a person of a plurality of images generated by at least one imaging unit installed in the train and generated at different timings to a passenger information processing device that performs person specifying processing, a processing result acquisition unit that acquires person specifying information which is a processing result of each of the plurality of images by the passenger information processing device and that specifies the person included in the image in association with attribute information for specifying a position of the person and a time point, a getting-on station management unit that causes a first storage unit to store getting-on station information that specifies a getting-on station of the person in association with the person specifying information of the person using the person specifying information and the attribute information associated with the person specifying information, and a getting-off station management unit that causes the first storage unit to store getting-off station information that specifies a getting-off station of the person in association with the person specifying information of the person using the person specifying information and the attribute information associated with the person specifying information.

In another embodiment, there is provided a passenger information processing device including an acquisition unit that acquires information on a portion including at least a person of a plurality of images generated by at least one imaging unit installed in the train and generated at different timings, an image processing unit that acquires person specifying information of a person who gets on the train using a feature amount of a person included in the image, and a transmission unit that transmits the person specifying information acquired by the image processing unit to a passenger management device installed in the train.

The acquisition unit acquires getting on-and-off information indicating a getting-on station and a getting-off station of the person indicated by the person specifying information in association with the person specifying information from the passenger management device.

The passenger information processing device further includes a settlement processing unit that performs settlement processing on a fare for the train using the getting on-and-off information and the person specifying information.

In still another embodiment, there is provided a passenger management method causing a computer installed in a train to perform transmitting information on a portion including at least a person of a plurality of images generated by at least one imaging unit installed in the train and generated at different timings to a passenger information processing device that performs person specifying processing, acquiring person specifying information which is a processing result of each of the plurality of images by the passenger information processing device and that specifies the person included in the image in association with attribute information for specifying a position of the person and a time point, causing a first storage unit to store getting-on station information that specifies a getting-on station of the person in association with the person specifying information of the person using the person specifying information and the attribute information associated with the person specifying information, and causing the first storage unit to store getting-off station information that specifies a getting-off station of the person in association with the person specifying information of the person using the person specifying information and the attribute information associated with the person specifying information.

In still another embodiment, there is provided a passenger management method causing a computer to perform acquiring information on at least a portion including a person of a plurality of images generated by at least one imaging unit installed in the train and generated at different timings, acquiring person specifying information of a person who gets on the train using a feature amount of a person included in the image, transmitting the acquired person specifying information to a passenger management device installed in the train, acquiring getting on-and-off information indicating a getting-on station and a getting-off station of the person indicated by the person specifying information in association with the person specifying information from the passenger management device, and performing settlement processing on a fare for the train using the getting on-and-off information and the person specifying information.

In still another embodiment, there is provided a program causing a computer installed in a train to perform a function of transmitting information on a portion including at least a person of a plurality of images generated by at least one imaging unit installed in the train and generated at different timings to a passenger information processing device that performs person specifying processing, a function of acquiring person specifying information which is a processing result of each of the plurality of images by the passenger information processing device and that specifies the person included in the image in association with attribute information for specifying a position of the person and a time point, a function of causing a first storage unit to store getting-on station information that specifies a getting-on station of the person in association with the person specifying information of the person using the person specifying information and the attribute information associated with the person specifying information, and a function of causing the first storage unit to store getting-off station information that specifies a getting-off station of the person in association with the person specifying information of the person using the person specifying information and the attribute information associated with the person specifying information.

In still another embodiment, there is provided a program causing a computer to perform a function of acquiring information on at least a portion including a person of a plurality of images generated by at least one imaging unit installed in the train and generated at different timings, a function of acquiring person specifying information of a person who gets on the train using a feature amount of a person included in the image, a function of transmitting the acquired person specifying information to a passenger management device installed in the train, a function of acquiring getting on-and-off information indicating a getting-on station and a getting-off station of the person indicated by the person specifying information in association with the person specifying information from the passenger management device, and a function of performing settlement processing on a fare for the train using the getting on-and-off information and the person specifying information.

According to the invention, the convenience of the passenger using the paid seat is improved.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3 is a table showing an example of information stored in a first storage unit.

FIG. 4 is a table showing an example of information stored in a second storage unit.

FIG. 5 is a table showing an example of information stored in a customer information storage unit.

FIG. 17 is a table showing an example of information stored in a second storage unit according to the fourth embodiment.

FIG. 19 is a table showing an example of a data configuration of a customer information storage unit according to a fifth embodiment.

DETAILED DESCRIPTION

Figure 1:
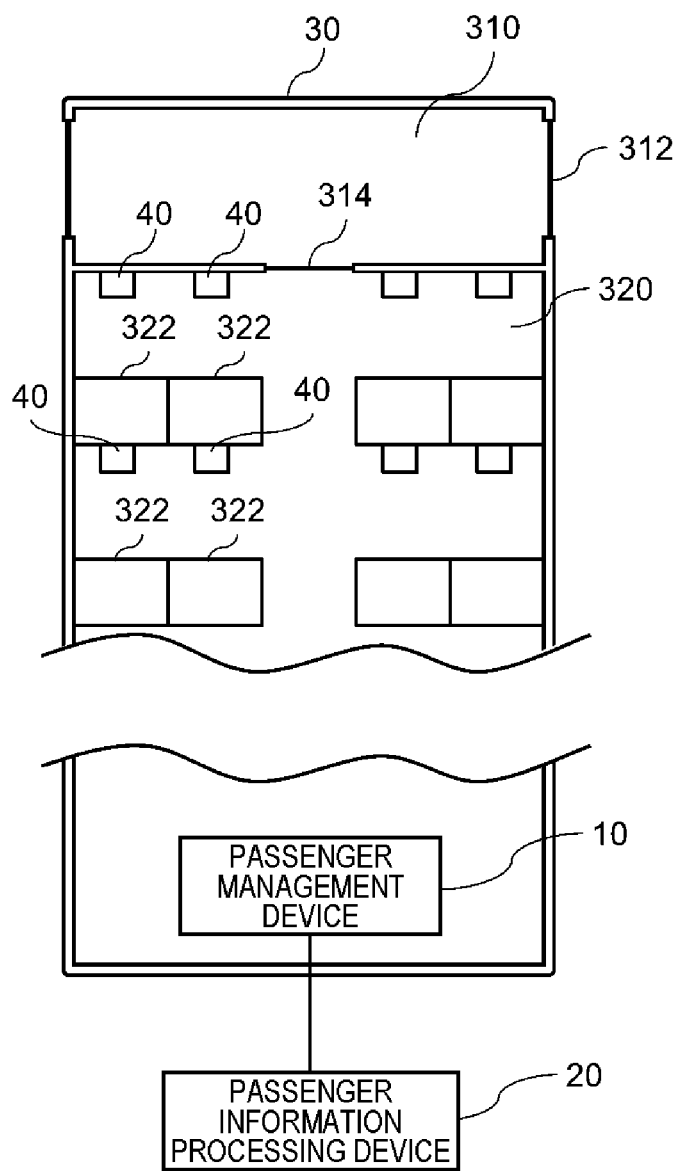
FIG. 1 is a diagram showing a configuration of a passenger management system according to a first embodiment.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments of the invention will be described with reference to drawings. In all the drawings, the same reference numeral is assigned to the same component and a description thereof will not be repeated.

First Embodiment

<Functional Configuration Example>

FIG. 1 is a diagram showing a configuration of a passenger management system according to this embodiment. The passenger management system is a system that manages a passenger who gets on a train 30 and has a passenger management device 10, a passenger information processing device 20, and a first camera 40. The passenger management device 10 and the first camera 40 are located inside the train 30, and the passenger information processing device 20 is located outside the train 30. The passenger management device 10 and the passenger information processing device 20 are connected through a public communication network such as the Internet. However, the passenger management device 10 and the passenger information processing device 20 may be connected to each other by a dedicated line.

The train 30 has a deck 310 and a cabin portion 320. The deck 310 is provided with an entrance 312, and a door 314 is provided between the deck 310 and the cabin portion 320. The cabin portion 320 is provided with a plurality of seats 322. The passenger needs to pay a fare to use the seat 322.

The first camera 40 repeatedly images a person seated on the seat 322. The image generated by the first camera 40 may be a still image or a moving image. An operation timing of the first camera 40 may be, for example, after a reference time elapses from a departure of the train 30 from a station or at regular intervals. Here, the reference time is, for example, equal to or larger than 10 seconds and equal to or less than five minutes, preferably equal to or larger than 15 seconds and equal to or less than one minute, but is not limited thereto. The regular interval is, for example, equal to or larger than 0.1 second and equal to or less than five minutes, but is not limited thereto. In this example, the first camera 40 generates a plurality of images. Generation timings of these images are different from each other.

The first camera 40 transmits the generated image to the passenger management device 10. The passenger management device 10 transmits information on a portion including at least a person (for example, a portion including a face) of the image acquired from the first camera 40 to the passenger information processing device 20. Here, the first camera 40 may transmit the image itself acquired from the first camera 40 to the passenger information processing device 20. The passenger information processing device 20 processes the image acquired from the passenger management device 10 to specify the person seated on the seat 322. Further, the passenger management device 10 specifies a station where the person gets on and a station where the person gets off, and transmits information indicating the getting-on station and the getting-off station to the passenger information processing device 20. The passenger information processing device 20 performs a settlement processing of a use fare for the seat 322.

An image transmission unit 110 described below of the passenger management device may calculate a score indicating certainty of being a face for the generated images. In this case, the passenger management device 10 selects an image having a score equal to or larger than a reference value among the generated images and transmits the selected image to the passenger information processing device 20. In this case, the image transmission unit 110 may cut out a face area from the image and transmit the cut-out area to the passenger information processing device 20.

The operation timing of the first camera 40 may be, for example, a operation of a button by the passenger. For example, in a case where there is a display unit (for example, a display unit 330 shown in a second embodiment) that indicates that the seat 322 is being used but a display on this display unit does not switch to the state of being used, the passenger operates a button provided near the seat 322. With this operation, the first camera 40 may transmit the image to the passenger management device 10. In a case where the first camera 40 generates a moving image, the image transmission unit 110 described below of the passenger management device 10 may perform a processing on a frame image transmitted from the first camera 40 at the timing when the button is operated.

In a case where the passenger management device 10 can communicate with a portable terminal possessed by the passenger, the first camera 40 may operate when predetermined information is transmitted from the portable terminal. In this case, for example, a camera of the portable terminal may image code information provided on the seat 322, and the code information may be transmitted to the passenger management device 10. In this manner, the passenger management device 10 can determine the first camera 40 to be operated.

The passenger management device 10 may transmit information for checking a processing start to the portable terminal. In this case, a display for causing a customer to check the processing start is performed on the portable terminal. The customer checks this display and then inputs the processing start to the portable terminal. The portable terminal transmits a trigger for the processing start to the passenger management device 10. With this, the passenger management device 10 causes the first camera 40 to generate an image.

In the example shown in FIG. 1, the first camera 40 is provided for each of the plurality of seats 322. Each first camera 40 is located in front of a corresponding seat 322. The person seated on the seat 322 is imaged from the front. Each time the first camera 40 generates an image, the passenger management device 10 transmits the image to the passenger information processing device 20. However, a layout of the first camera 40 is not limited to the example shown in FIG. 1. For example, one first camera 40 may be provided for the plurality of seats 322.

Figure 2:
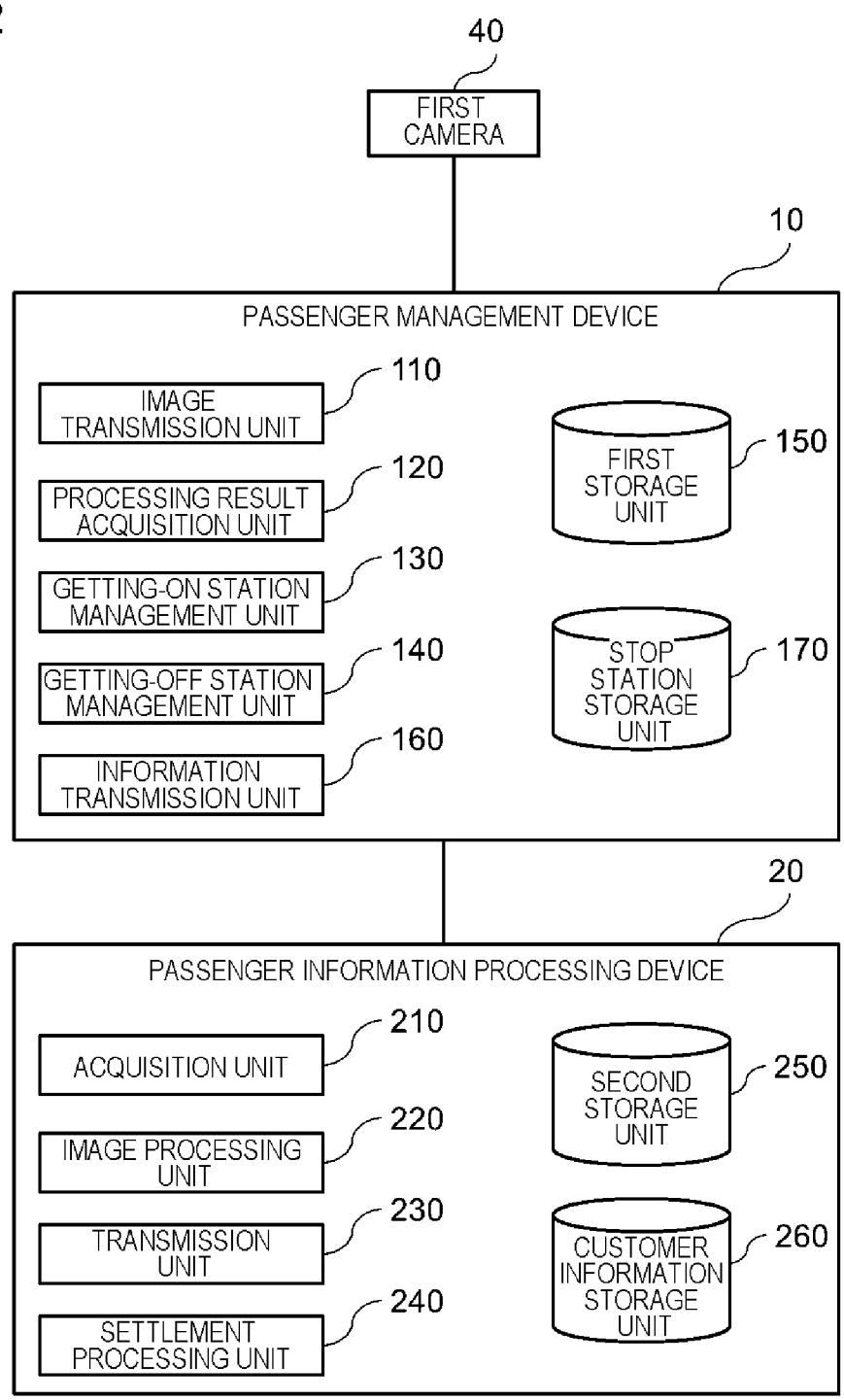
FIG. 2 is a diagram showing an example of functional configurations of a passenger management device and a passenger information processing device.

FIG. 2 is a diagram showing an example of functional configurations of the passenger management device 10 and the passenger information processing device 20.

First, the functional configuration of the passenger management device 10 will be described. The passenger management device 10 includes the image transmission unit 110, a processing result acquisition unit 120, a getting-on station management unit 130, and a getting-off station management unit 140.

As described above, the passenger management device 10 is connected to the first camera 40. The image transmission unit 110 transmits the plurality of images generated by the first camera 40 to the passenger information processing device 20. The passenger information processing device 20 performs person specifying processing using the image. The processing result acquisition unit 120 acquires a processing result by the passenger information processing device 20. This processing result is generated for each of the plurality of images and is obtained by associating person specifying information that specifies a person included in the image with attribute information of the passenger.

The person specifying information may be, for example, a name, but is preferably an ID (customer ID) uniquely assigned to the person such as a member number since a passenger having the same first and last name may get on the same vehicle. The attribute information is information for specifying a position of the person and a time point. For example, when the passenger management device 10 transmits an image to the passenger information processing device 20, the attribute information is transmitted together with the image. The attribute information includes, for example, camera specifying information that specifies a first camera 40 that generates the image to be processed and a time point at which the image is generated. The camera specifying information is, for example, a camera ID uniquely assigned to each first camera 40 or a seat number corresponding to the first camera 40. In the former case, the camera ID can be converted into the seat number corresponding to the first camera 40 by using a database or a conversion rule. In a case where the train 30 has a plurality of vehicles, the seat number includes information indicating a vehicle number (car number) provided with the seat.

The attribute information may include information that specifies a position of the train when the image is generated, instead of the time point described above. The information that specifies the position is, for example, latitude and longitude information based on GPS information, but is not limited thereto.

The getting-on station management unit 130 generates information (hereinafter referred to as getting-on station information) that specifies a station (hereinafter referred to as getting-on station) at which the passenger starts to use the seat 322 using the person specifying information and the attribute information associated with the person specifying information, and causes a first storage unit 150 to store the getting-on station information in association with the person specifying information of the passenger. The getting-off station management unit 140 generates information (hereinafter referred to as getting-off station information) that specifies a station (hereinafter referred to as getting-off station) at which the passenger ends the use of the seat 322 using the person specifying information and the attribute information associated with the person specifying information, and causes the first storage unit 150 to store the getting-off station information in association with the person specifying information of the passenger. In this case, it is preferable that the getting-off station management unit 140 causes the first storage unit 150 to store a stop time point at a stop station as a getting-off time point. Details of the processing performed by the getting-on station management unit 130 and the getting-off station management unit 140 will be described below using flowcharts.

In the example shown in FIG. 2, the first storage unit 150 is a part of the passenger management device 10. However, the first storage unit 150 may be a storage provided outside the passenger management device 10. However, this storage is also mounted on the train 30.

In the example shown in FIG. 2, the passenger management device 10 includes a stop station storage unit 170. The stop station storage unit 170 stores the latest stop station of the train 30. The getting-off station management unit 140 generates the getting-off station information using the information stored in the stop station storage unit 170 as described below using the flowchart. The information stored in the stop station storage unit 170 is updated, for example, by the getting-off station management unit 140 each time the train 30 stops at a new station.

In the example shown in FIG. 2, the passenger management device 10 includes an information transmission unit 160. The information transmission unit 160 transmits the information stored in the first storage unit 150 to the passenger information processing device 20. The information transmitted to the passenger information processing device 20 includes the person specifying information of the passenger and getting on-and-off information of the passenger. The getting on-and-off information includes the getting-on station information and the getting-off station information of the person. The person specifying information and the getting on-and-off information are stored in a second storage unit 250. Information stored in the second storage unit 250 is used for the settlement processing as described below.

Next, the functional configuration of the passenger information processing device 20 will be described. The passenger information processing device 20 includes an acquisition unit 210, an image processing unit 220, and a transmission unit 230.

The acquisition unit 210 acquires the plurality of images transmitted by the passenger management device 10.

The image processing unit 220 performs the following processing on each of the plurality of images acquired by the acquisition unit 210. First, the image processing unit 220 generates a feature amount of a person included in the image. The image processing unit 220 acquires the person specifying information of the person who gets on the train 30 using the generated feature amount. In the example shown in FIG. 2, the image processing unit 220 uses information stored in a customer information storage unit 260. The customer information storage unit 260 stores the person specifying information in association with the feature amount on the image of the person. The image processing unit 220 acquires the person specifying information corresponding to the generated feature amount from the customer information storage unit 260.

The transmission unit 230 transmits the person specifying information acquired by the image processing unit 220 to the passenger management device 10.

In the example shown in FIG. 2, the customer information storage unit 260 is a part of the passenger information processing device 20. However, the customer information storage unit 260 may be a storage outside the passenger information processing device 20.

In the example shown in FIG. 2, the passenger information processing device 20 includes a settlement processing unit 240 and the above-described second storage unit 250. As described above, the second storage unit 250 stores the person specifying information of the passenger and the getting-on station information and getting-off station information of the passenger. The settlement processing unit 240 performs the settlement processing using the information stored in the second storage unit 250. The second storage unit 250 may be a storage outside the passenger information processing device 20. The settlement processing unit 240 may be a device outside the passenger information processing device 20.

FIG. 3 is a table showing an example of the information stored in the first storage unit 150. As described above, the first storage unit 150 stores the person specifying information, the getting-on station information, and the getting-off station information for each passenger. In the example shown in FIG. 3, the first storage unit 150 stores the attribute information. This attribute information further includes information for specifying the seat of the passenger (hereinafter referred to as seat information). The seat information is, for example, the above-described seat number. The attribute information may further include a time point at which the passenger departs from the getting-on station and a time point at which the passenger arrives at the getting-off station.

FIG. 4 is a table showing an example of the information stored in the second storage unit 250. The second storage unit 250 stores information shown in FIG. 4, for example, a getting-on date and time, the seat information, the getting-on station, and the getting-off station for each person specifying information. In the example shown in FIG. 4, the second storage unit 250 further stores information (hereinafter referred to as settlement information) indicating whether or not the settlement for a fare is completed. The information shown in FIG. 4 is generated each time the passenger gets on or off the train 30.

FIG. 5 is a table showing an example of the information stored in the customer information storage unit 260. The customer information storage unit 260 stores the feature amount of the face of the person and information indicating a settlement means used by the person for settlement (hereinafter, referred to as settlement means information) for each person specifying information. The settlement means information is, for example, information that specifies an electronic settlement means such as a credit card number, a bank account number, or a type of prepaid electronic money and a customer ID (member ID).

<Hardware Configuration Example>

Figure 6:
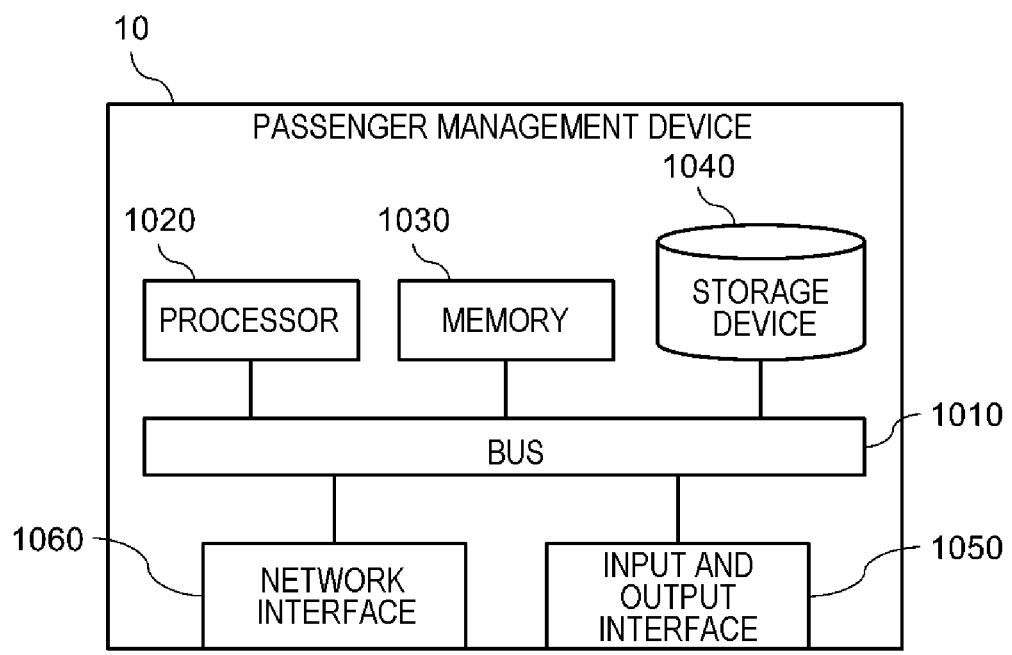
FIG. 6 is a block diagram illustrating a hardware configuration of the passenger management device.

FIG. 6 is a block diagram illustrating a hardware configuration of the passenger management device 10. The passenger management device 10 includes a bus 1010, a processor 1020, a memory 1030, a storage device 1040, an input and output interface 1050, and a network interface 1060.

The bus 1010 is a data transmission path for the processor 1020, the memory 1030, the storage device 1040, the input and output interface 1050, and the network interface 1060 to mutually transmit and receive data. However, a method of mutually connecting the processors 1020 and the like is not limited to the bus connection.

The processor 1020 is a processor formed by a central processing unit (CPU) or a graphics processing unit (GPU).

The memory 1030 is a main storage device formed by a random access memory (RAM) or the like.

The storage device 1040 is an auxiliary storage device formed by a hard disk drive (HDD), a solid state drive (SSD), a memory card, a read only memory (ROM), or the like. The storage device 1040 stores a program module that realizes each function of the passenger management device 10. The processor 1020 reads each of the program modules into the memory 1030 and executes each program module to realize each function corresponding to the program module.

The input and output interface 1050 is an interface for connecting the passenger management device 10 to various input and output devices.

The network interface 1060 is an interface for connecting the passenger management device 10 to a network. This network is, for example, a local area network (LAN) or a wide area network (WAN). A method of connecting the network interface 1060 to the network may be a wireless connection or a wired connection.

The passenger management device 10 connects to necessary devices (for example, the first camera 40 and the passenger information processing device 20) through the input and output interface 1050 or the network interface 1060.

The hardware configuration of the passenger management device 10 is not limited to the example described above. For example, the passenger management device 10 may include a CPU, a GPU, a memory, and a storage. Further, the passenger management device 10 may be a field-programmable gate array (FPGA).

A hardware configuration of the passenger information processing device 20 is the same as the hardware configuration of the passenger management device 10 shown in FIG. 6.

<Operation Example>

Figure 7:
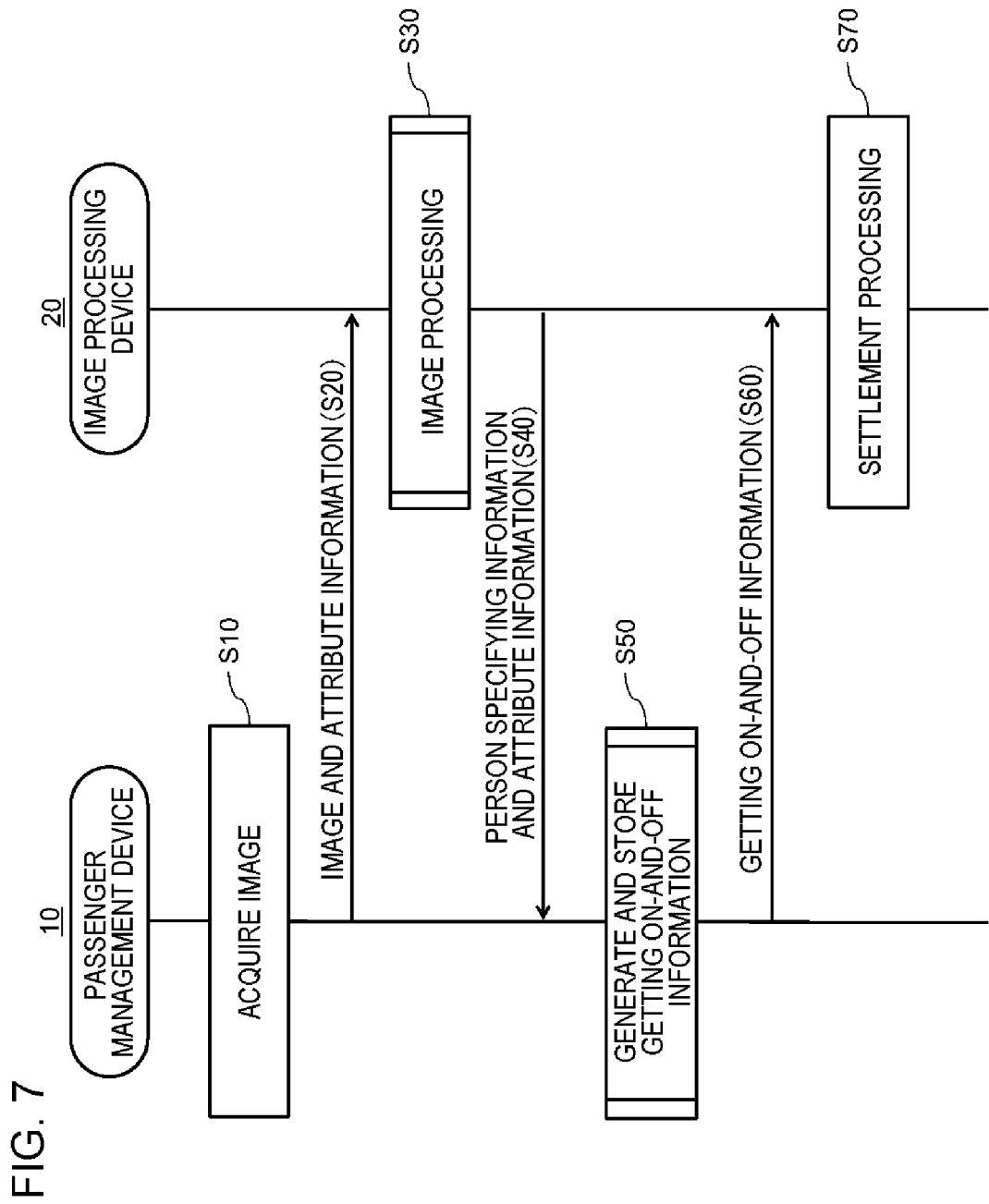
FIG. 7 is a flowchart showing an operation example of the passenger management device and the passenger information processing device.

FIG. 7 is a flowchart showing an operation example of the passenger management device 10 and the passenger information processing device 20. The passenger management device 10 and the passenger information processing device 20 perform the processing shown in FIG. 7, for example, each time the first camera 40 generates an image. However, a timing at which the passenger management device 10 and the passenger information processing device 20 perform the processing shown in FIG. 7 may be, for example, after a reference time elapses from a departure of the train 30 from a station, or at regular intervals. Here, the reference time is, for example, equal to or larger than 10 seconds and equal to or less than five minutes, preferably equal to or larger than 20 seconds and equal to or less than one minute as described above, but is not limited thereto. The regular interval is, for example, equal to or larger than 0.1 second and equal to or less than five minutes as described above, but is not limited thereto. As described above, the timing at which the passenger management device 10 and the passenger information processing device 20 perform the processing shown in FIG. 7 may be a timing at which the operation of the button or the like by the passenger is performed.

When the first camera 40 generates an image, the image transmission unit 110 of the passenger management device 10 acquires the image (step S10) and transmits the acquired image to the passenger information processing device 20 together with the attribute information of the image (step S20). As described above, the attribute information includes the camera specifying information that specifies the first camera 40 and the time point when the image is generated, and is also used as the attribute information of the person specifying information. Here, the image transmission unit 110 may cut out an area including the passenger from the image generated by the image transmission unit 110, and transmit the cut-out image to the passenger information processing device 20.

The acquisition unit 210 of the passenger information processing device 20 acquires the image and the attribute information transmitted by the passenger management device 10. The image processing unit 220 processes the image to acquire the person specifying information of a passenger appearing in the image (step S30). The transmission unit 230 transmits the person specifying information to the passenger management device 10 together with the attribute information associated with the image (step S40).

In a case where the first camera 40 is provided for each seat, the attribute information includes the camera specifying information acquired from the passenger management device 10 as the seat information. The seat information may be generated by the image processing unit 220 based on a position of the person in the image. In this case, the attribute information includes the seat information generated by the image processing unit 220.

There is a case, depending on the first camera 40, where the generated image may not include a person, that is, a passenger does not seat on the seat 322 corresponding to the first camera 40. In this case, the transmission unit 230 does not transmit the processing result of the image generated by the first camera 40 to the passenger management device 10 or transmits vacant seat information indicating that the seat 322 is vacant to the passenger management device 10 together with the seat information corresponding to the first camera 40.

In a case where the passenger management device 10 transmits an image including a face (or an image obtained by trimming an area including a face) to the passenger information processing device 20, this processing is not performed.

The getting-on station management unit 130 of the passenger management device 10 generates the getting-on station information using the person specifying information and the attribute information received from the passenger information processing device 20, and causes the first storage unit 150 to store the generated getting-on station information together with the received person specifying information. In this case, the getting-on station management unit 130 may cause the first storage unit 150 to store the time point at which the train 30 departs from the getting-on station as a getting-on time point of the passenger. The getting-off station management unit 140 generates the getting-off station information using the person specifying information and the attribute information received from the passenger information processing device 20, and causes the first storage unit 150 to store the generated getting-off station information together with the received person specifying information. In this case, the getting-off station management unit 140 may cause the first storage unit 150 to store the time point at which the train 30 arrives at the getting-off station as the getting-off time point of the passenger (step S50).

The information transmission unit 160 specifies the person specifying information in which the getting-off station information is newly stored in the first storage unit 150, that is, the person specifying information of the passenger who gets off the train, reads out the getting-on station information and the getting-off information associated with the person specifying information from the first storage unit 150, and transmits the read information to the passenger information processing device 20 (step S60). After the transmission, the information transmission unit 160 may delete the information transmitted to the passenger information processing device 20 from the first storage unit 150.

The settlement processing unit 240 of the passenger information processing device 20 causes the second storage unit 250 to store the person specifying information, the getting-on station information, and the getting-off station information received from the passenger management device 10. The settlement processing unit 240 determines an amount of money corresponding to a section using the received getting-on station information and getting-off station information. The determination of the amount of money is performed using, for example, a fare database. This fare database may be stored in the passenger information processing device 20 or may be stored in a device outside the passenger information processing device 20. The settlement processing unit 240 reads out settlement means information corresponding to the received person specifying information from the customer information storage unit 260, and performs the settlement processing of the determined amount of money using the settlement means information which is read out (step S70). Thereafter, the settlement processing unit 240 updates the settlement information stored in the customer information storage unit 260 corresponding to the received person specifying information to the settlement completed.

Figure 8:
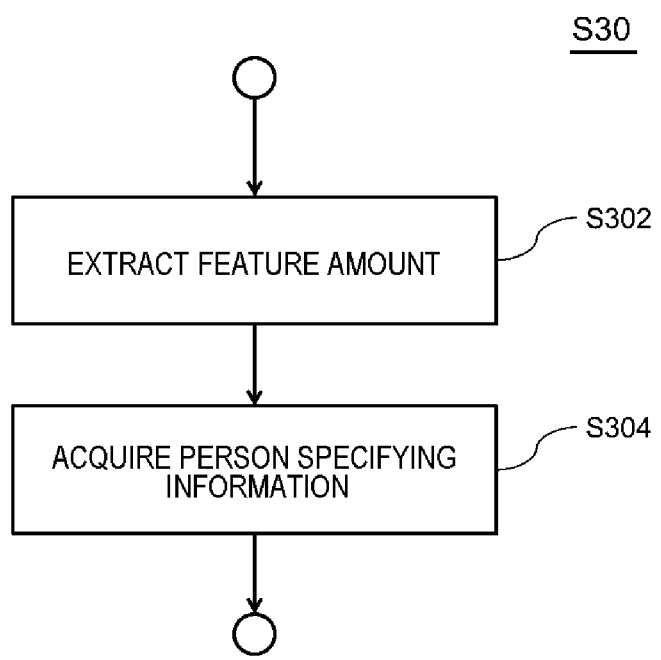
FIG. 8 is a flowchart showing a detailed example of step S30 in FIG. 7.

FIG. 8 is a flowchart showing a detailed example of step S30 of FIG. 7, that is, acquisition processing of the person specifying information. The image processing unit 220 processes the image acquired by the acquisition unit 210 to extract the feature amount of the face included in the image (step S302). On the other hand, the customer information storage unit 260 stores the feature amount in association with the person specifying information as described with reference to FIG. 5. The image processing unit 220 selects a feature amount whose matching degree satisfies a criterion or a feature amount having the highest matching degree, with respect to the feature amount extracted in step S302, from the customer information storage unit 260. The image processing unit 220 acquires a person feature amount associated with the selected feature amount (step S304).

The acquisition processing of the person specifying information performed in step S30 of FIG. 7 may be performed using a result of machine learning.

Figure 9:
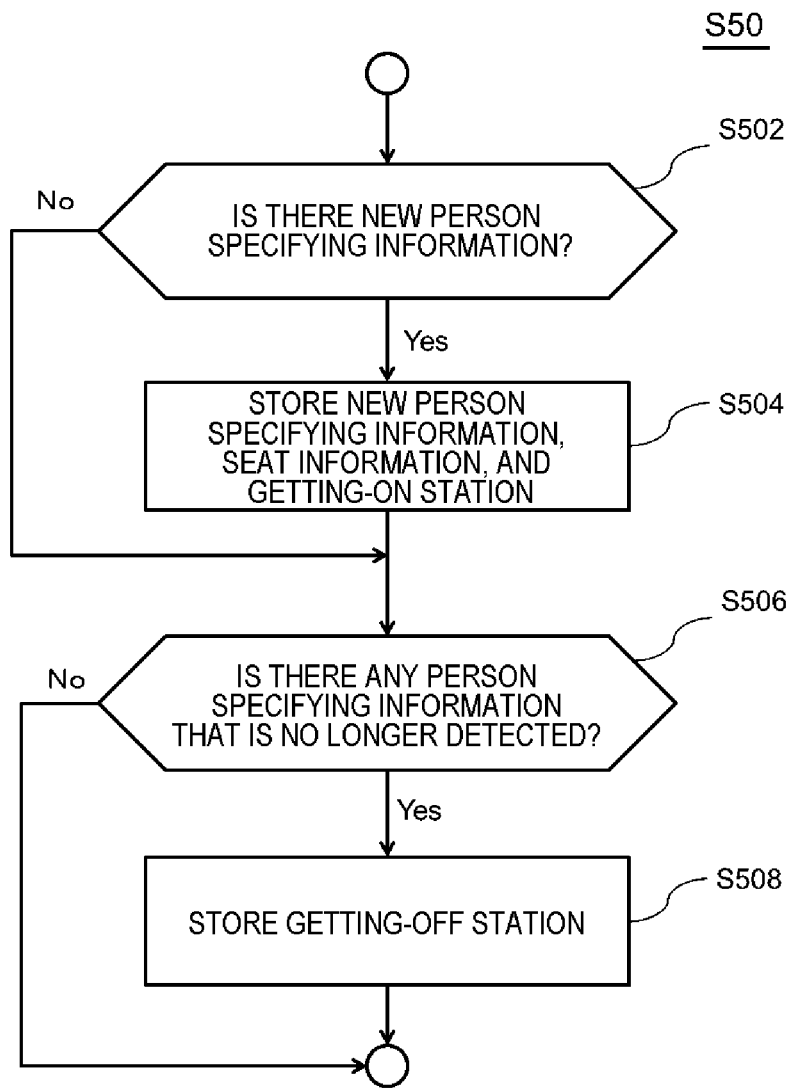
FIG. 9 is a flowchart showing a first example of step S50 in FIG. 7.

FIG. 9 is a flowchart showing a first example of step S50 of FIG. 7, that is, generation processing of the getting-on station information and the getting-off station information. As described with reference to FIG. 2, the stop station storage unit 170 stores information (for example, a station name or a station code) for determining the latest stop station. The passenger management device 10 repeatedly acquires processing results of first images of all the first cameras 40 from the passenger information processing device 20. The processing shown in FIG. 9 is performed based on the latest image processing result after the train 30 departs from a new stop station and then a certain time (for example, equal to or larger than one minute and equal to or less than five minutes, preferably equal to or larger than 30 seconds and equal to or less than one minute) elapses.

The getting-on station management unit 130 determines whether or not the person specifying information acquired from the passenger information processing device 20 includes person specifying information that is not stored in the first storage unit 150. In a case where new person specifying information is included (step S502: Yes), the getting-on station management unit 130 sets the station stored in the stop station storage unit 170 as the getting-on station of the passenger. Specifically, the getting-on station management unit 130 causes the first storage unit 150 to store the person specifying information in association with the seat information transmitted in association with the person specifying information, and causes the first storage unit 150 to store information that determines the station stored in the stop station storage unit 170 as the getting-on station information corresponding to the person specifying information (step S504).

The getting-off station management unit 140 determines whether there is any information that is not included in the person specifying information acquired from the passenger information processing device 20 among the person identification information stored in the first storage unit 150, that is, whether there is any person specifying information that is no longer detected after the train stops at the latest stop station. In a case where there is any person specifying information that is no longer detected (step S506: Yes), the getting-off station management unit 140 sets the station stored in the stop station storage unit 170 as the getting-off station of the passenger. Specifically, the getting-off station management unit 140 causes the first storage unit 150 to store the information that determines the station stored in the stop station storage unit 170 as the getting-off station information corresponding to the person specifying n information (step S508).

Figure 10:
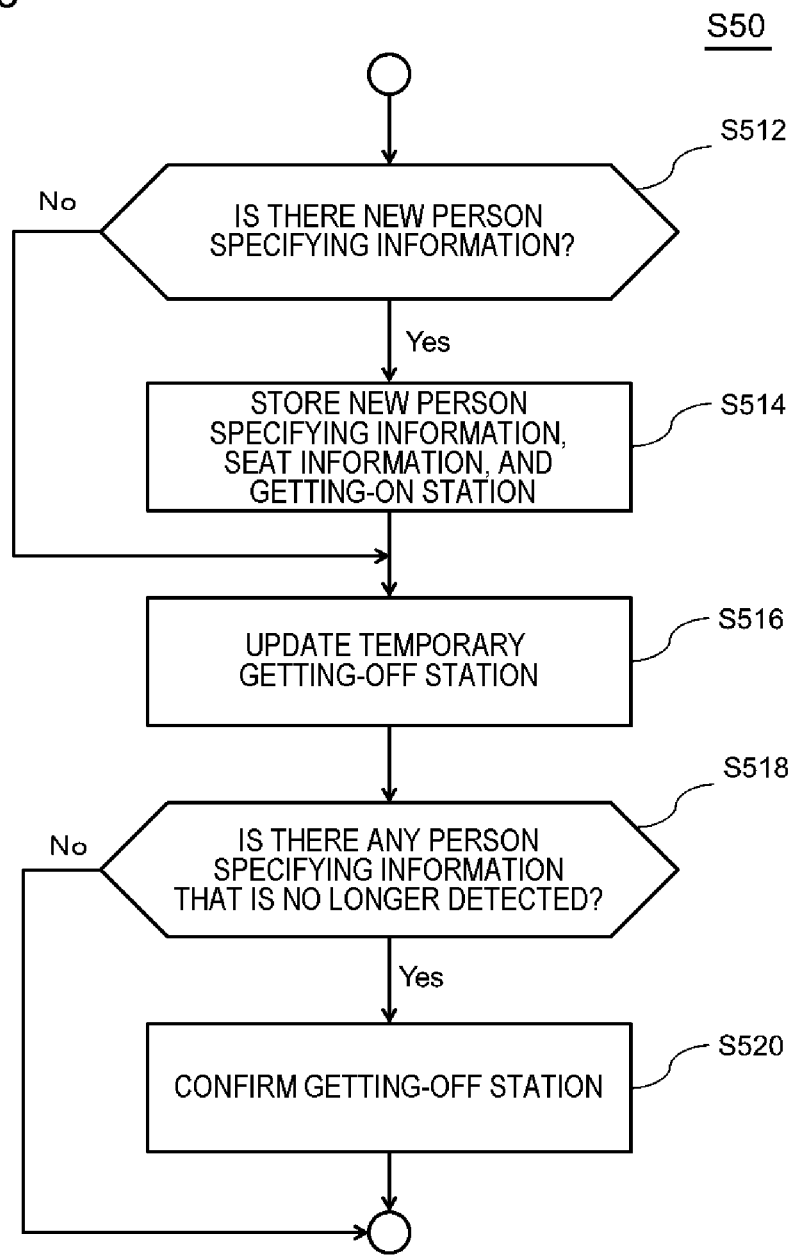
FIG. 10 is a flowchart showing a second example of step S50 in FIG. 7.

FIG. 10 is a flowchart showing a second example of step S50 of FIG. 7, that is, the generation processing of the getting-on station information and the getting-off station information. Step S512 in FIG. 10 is the same as step S502 in FIG. 9, and step S514 in FIG. 10 is the same as step S504 in FIG. 9.

On the other hand, the getting-off station management unit 140 associates the information that determines the latest stop station stored in the stop station storage unit 170 with all the person specifying information for which the getting-off station is not confirmed as temporary getting-off station information, and causes the first storage unit 150 to store the associated information. Specifically, the information stored in the stop station storage unit 170 is updated each time the train 30 stops at a new station. The getting-off station management unit 140 also updates the temporary getting-off station information stored in the first storage unit 150 accompanying the update of the stop station storage unit 170 (step S516).

In a case where there is the person specifying information that is no longer detected after the train stops at the stop station (step S518: Yes), the getting-off station management unit 140 confirms the temporary getting-off station information associated with the person specifying information in the first storage unit 150 as official getting-off station information (step S520). With this, an authentication mistake of the getting-off station by the getting-off station management unit 140 is reduced.

There is a case where the passenger temporarily leaves the seat 322. In order to cope with such a case, it is preferable that step S520 is performed, for example, after the train 30 arrives at a terminal station or after business on that day ends.

Figure 11:
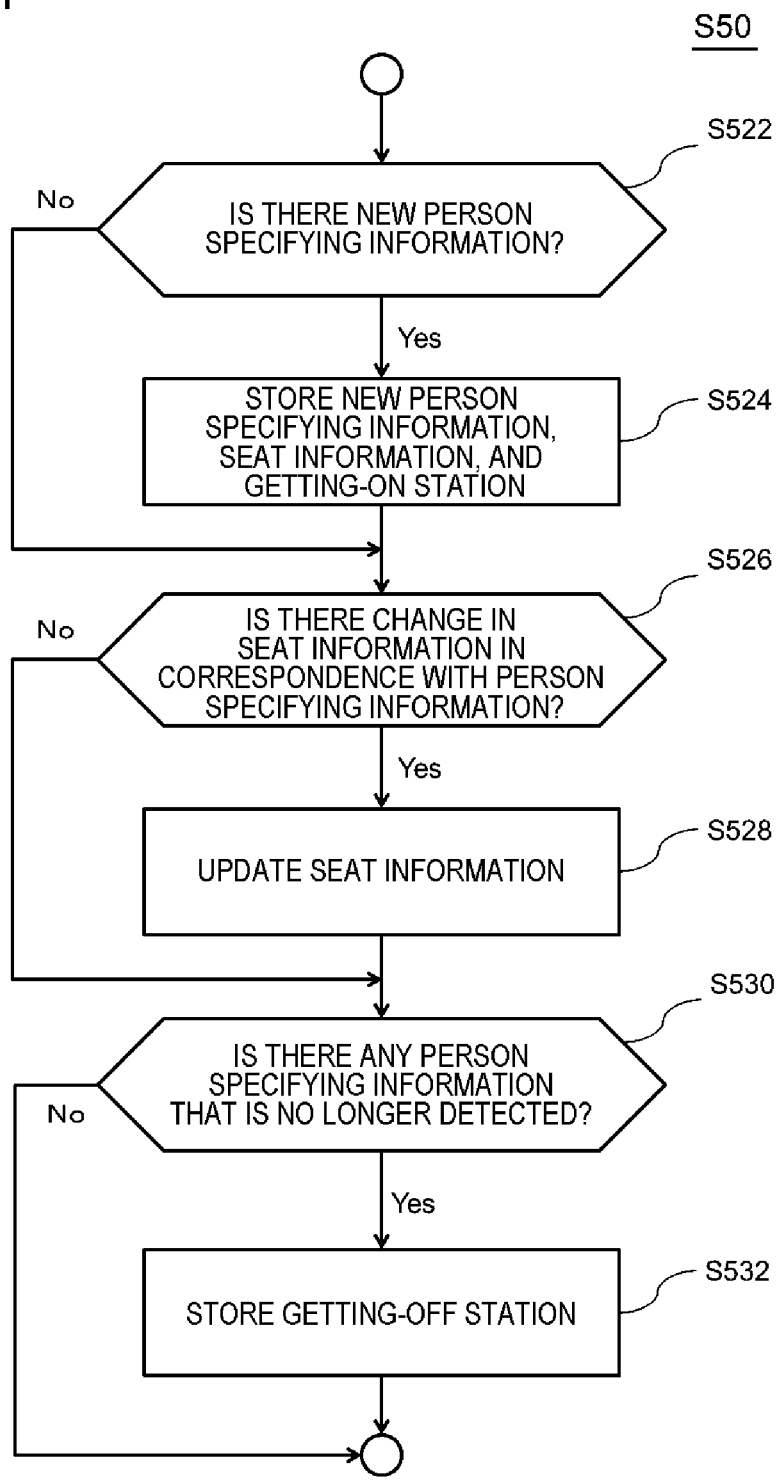
FIG. 11 is a flowchart showing a third example of step S50 in FIG. 7.

FIG. 11 is a flowchart showing a third example of step S50 of FIG. 7, that is, the generation processing of the getting-on station information and the getting-off station information. The processing shown in FIG. 11 is the same as the processing shown in FIG. 9 except that the seat information is updated in a case where the seat on which the passenger seats is changed halfway.

First, step S522 in FIG. 11 is the same as step S502 in FIG. 9, and step S524 in FIG. 11 is the same as step S504 in FIG. 9.

The passenger information processing device 20 transmits the attribute information to the passenger management device 10 in association with the person specifying information. This attribute information includes the seat information. The getting-on station management unit 130 of the passenger management device 10 checks whether or not the seat information associated with the person specifying information matches the seat information stored in the first storage unit 150 associated with the person specifying information. In a case where the pieces of information match, the first storage unit 150 is not updated. The passenger may temporarily leave the seat 322. However, in this case, the first storage unit 150 is not updated since the passenger returns to the same seat 322. On the other hand, in a case where the pieces of information do not match, the seat information stored in the first storage unit 150 is updated to seat information newly acquired from the passenger information processing device 20 assuming that the passenger changes the seat. The getting-on station management unit 130 performs this processing on each piece of person specifying information (steps S526 and S528).

Thereafter, the processing shown in steps S530 and S532 is performed. Step S530 in FIG. 11 is the same as step S506 in FIG. 9, and step S532 in FIG. 11 is the same as step S508 in FIG. 9.

The processing shown in steps S526 and S528 in FIG. 11 may be performed between steps S514 and S518 of the processing shown in FIG. 10.

In this embodiment, the passenger may pay the use fare for the seat 322 before getting-on. In this case, the passenger inputs own person specifying information at the time of payment. The customer information storage unit 260 stores payment information in association with the person specifying information input at the time of payment. The payment information includes information indicating a getting-on section where the fare is paid. The settlement processing unit 240 does not perform the settlement processing on the section where the use fare is paid before getting-on for the person specifying information in which the payment information is stored.

As described above, according to this embodiment, the passenger information processing device 20 processes the image imaged by the first camera 40 to specify the person specifying information of the person seated on the seat 322. The person specifying information is transmitted to the passenger management device 10 together with the seat information that specifies the seat 322. The passenger management device 10 specifies the getting-on station and getting-off station of the passenger using the information acquired from the passenger information processing device 20. The passenger information processing device 20 settles the use fare of the seat 322 using the getting-on station and the getting-off station specified by the passenger management device 10. Therefore, the passenger does not need to perform the settlement processing related to the use of the seat 322 or prepare for the settlement processing (for example, charge the electronic money). As a result, the convenience of the passenger is improved. Further, in a case where the passenger does not purchase a ticket for using the seat 322 in advance, it is possible to suppress an increase in a workload of a crew.

Further, since the passenger information processing device 20 is located outside the train 30, it is possible to suppress an increase in the size of the device mounted on the train 30.

Second Embodiment

<Functional Configuration Example>

Figure 12:
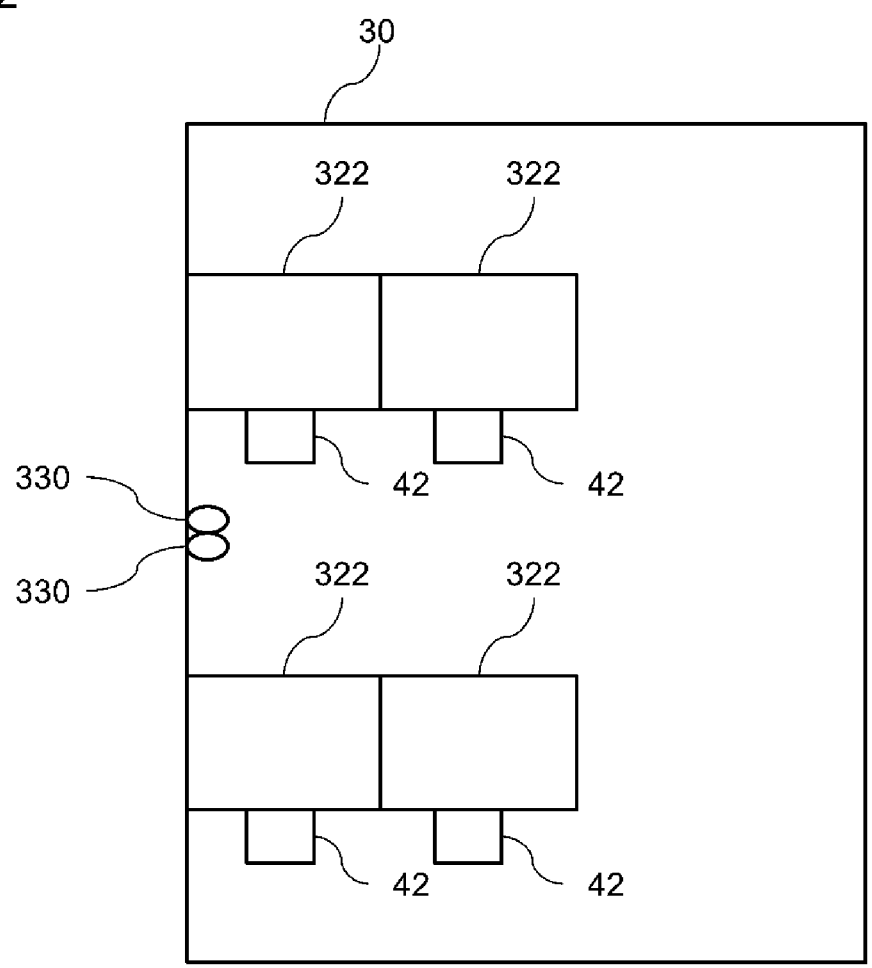
FIG. 12 is a diagram for describing a difference between a passenger management system according to a second embodiment and the passenger management system according to the first embodiment.

FIG. 12 is a diagram for describing a difference between a passenger management system according to this embodiment and the passenger management system according to the first embodiment. In this embodiment, the train 30 has the display unit 330. The display unit 330 indicates whether or not seat 322 is in use.

The display unit 330 indicates whether or not the seat 322 is in use by switching a display state. Here, in a case where the display unit 330 is an indication light provided for each seat 322, the display state is the presence or absence of lighting or a lighting color. The display unit 330 may be an area of a display assigned to each seat 322. In this case, the display state is contents to be displayed in the area.

The display state of the display unit 330 is controlled by the passenger management device 10.

Figure 13:
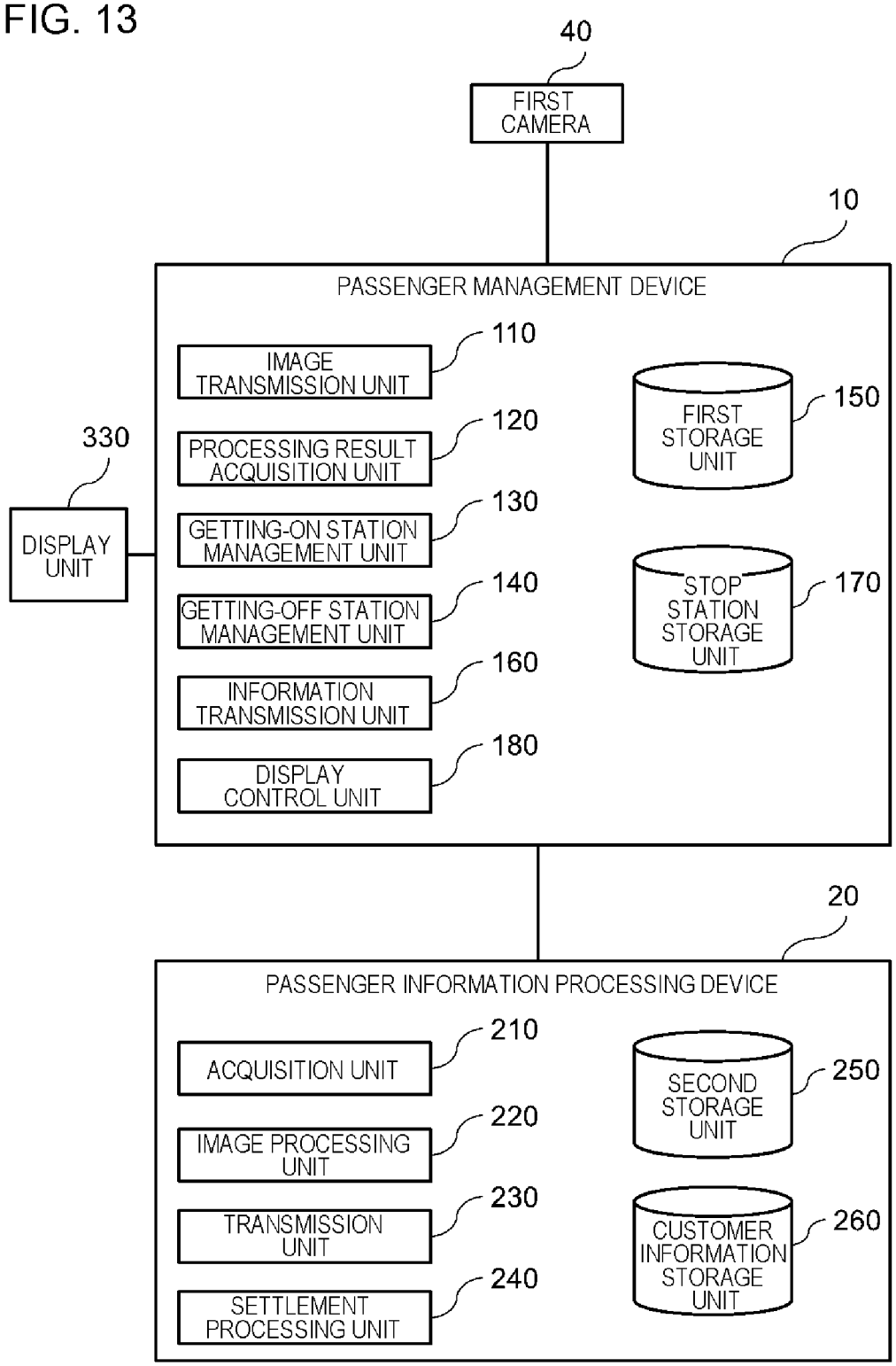
FIG. 13 is a diagram showing functional configurations of a passenger management device and a passenger information processing device according to the second embodiment.

FIG. 13 is a diagram showing functional configurations of the passenger management device 10 and the passenger information processing device 20 according to this embodiment. The passenger management system according to this embodiment has the same configuration as the passenger management system according to the first embodiment except that the passenger management device 10 includes a display control unit 180.

The passenger attribute information transmitted from the passenger information processing device 20 to the passenger management device 10 includes the seat information. This seat information means that the seat corresponding to the seat information is in use. The display control unit 180 controls the display state of the display unit 330 using the seat information.

For example, the display control unit 180 sets the display unit 330 corresponding to the seat information transmitted from the passenger information processing device 20 to a first state (for example, red light emission) indicating that the seat 322 is in use. On the other hand, the display control unit 180 sets the display unit 330 that does not correspond to the seat information transmitted from the passenger information processing device 20 to a second state (for example, blue light emission) indicating that the seat 322 is not in use.

For example, in a case where a passenger newly seats in a first seat 322 corresponding to first seat information, the first seat information is newly transmitted from the passenger information processing device 20, and the information stored in the first storage unit 150 is updated based on this information. With this, the display control unit 180 sets the display state of the first display unit 330 corresponding to the first seat information from the second state to the first state. Thereafter, the attribute information is repeatedly transmitted from the passenger information processing device 20. However, in a case where the first seat information is continuously included in the information, there is no need to update the information stored in the first storage unit 150. Therefore, the display control unit 180 maintains the first display unit 330 in the first state. In a case where the first seat 322 is vacant, the first seat information is no longer transmitted from the passenger information processing device 20. With this, the information stored in the first storage unit 150 is updated, and then the display control unit 180 returns the first display unit 330 from the first state to the second state.

For example, in a case where the passenger information processing device 20 manages a vacancy situation of the seat 322 or the like, the passenger information processing device 20 may transmit the vacant seat information indicating that the vacant seat 322 is vacant in association with the seat information to the passenger management device 10. In this case, the display control unit 180 sets the seat 322 associated with the vacant seat information to the second state and sets the seat 322 not associated with the vacant seat information to the first state.

According to this embodiment, the same effect as that of the first embodiment can be also obtained. Furthermore, the passenger management device 10 controls the display state of the display unit 330 corresponding to the seat 322 according to the use situation of the seat 322. Therefore, the passenger or the crew can easily specify the seat 322 in use.

Third Embodiment

<Functional Configuration Example>

Figure 14:
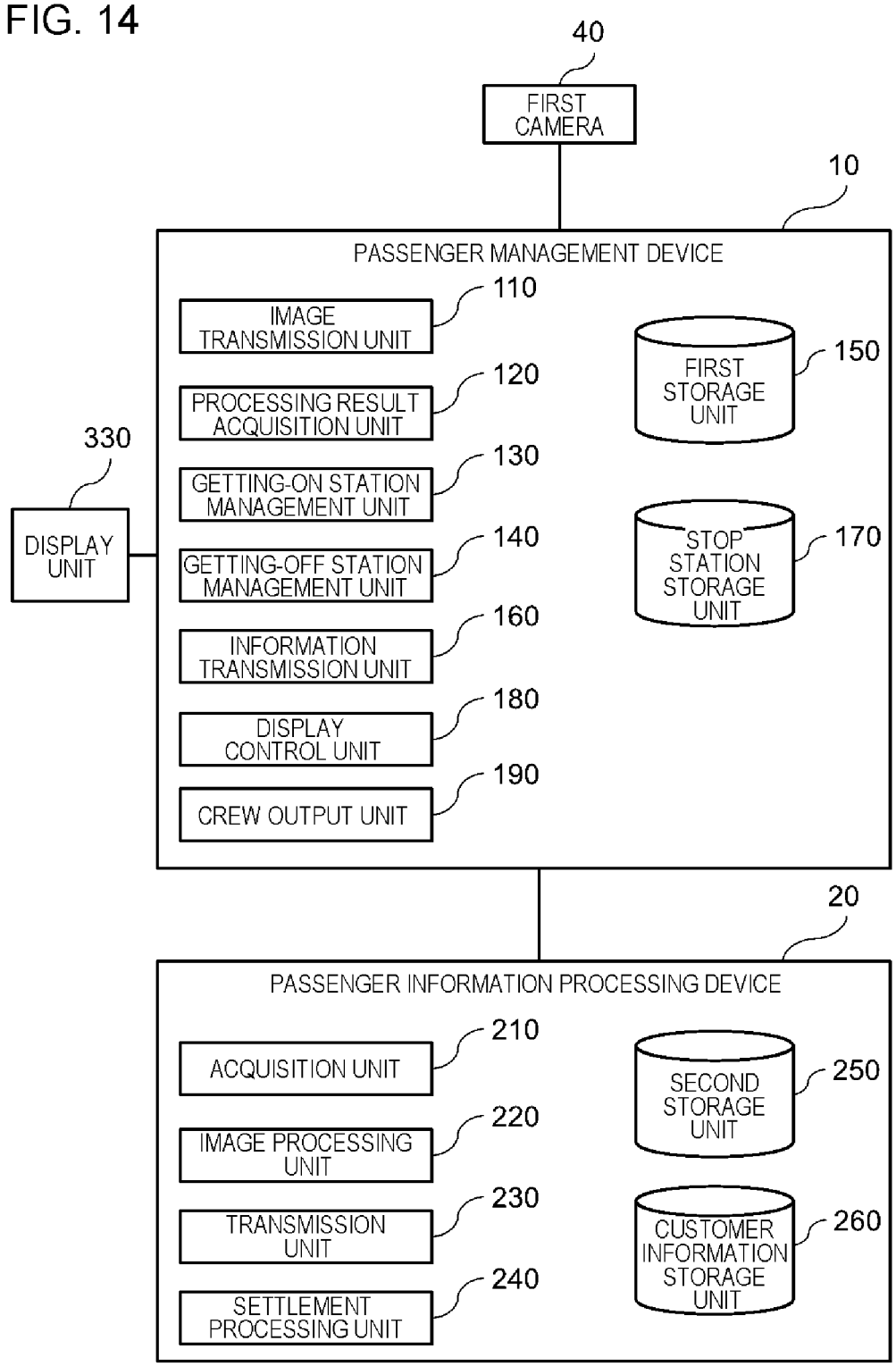
FIG. 14 is a diagram for describing functional configurations of a passenger management device and a passenger information processing device according to a third embodiment.

FIG. 14 is a diagram for describing functional configurations of the passenger management device 10 and the passenger information processing device 20 according to this embodiment. The passenger management system according to this embodiment has the same configuration as the passenger management system according to the second embodiment except that the passenger management device 10 includes a crew output unit 190. The crew output unit 190 outputs error information in a case of an abnormal state, such as a case where a customer seated on the seat 322 cannot be authenticated by the passenger information processing device 20. An output destination of the error information is, for example, a terminal that can be used by the crew of the train 30. This terminal may be fixed in the train 30 or may be a terminal carried by the crew.

<Operation Example>

In this embodiment, the operations of the passenger management device 10 and the passenger information processing device 20 when the passenger information processing device can authenticate the customer are as described in the second embodiment.

Figure 15:
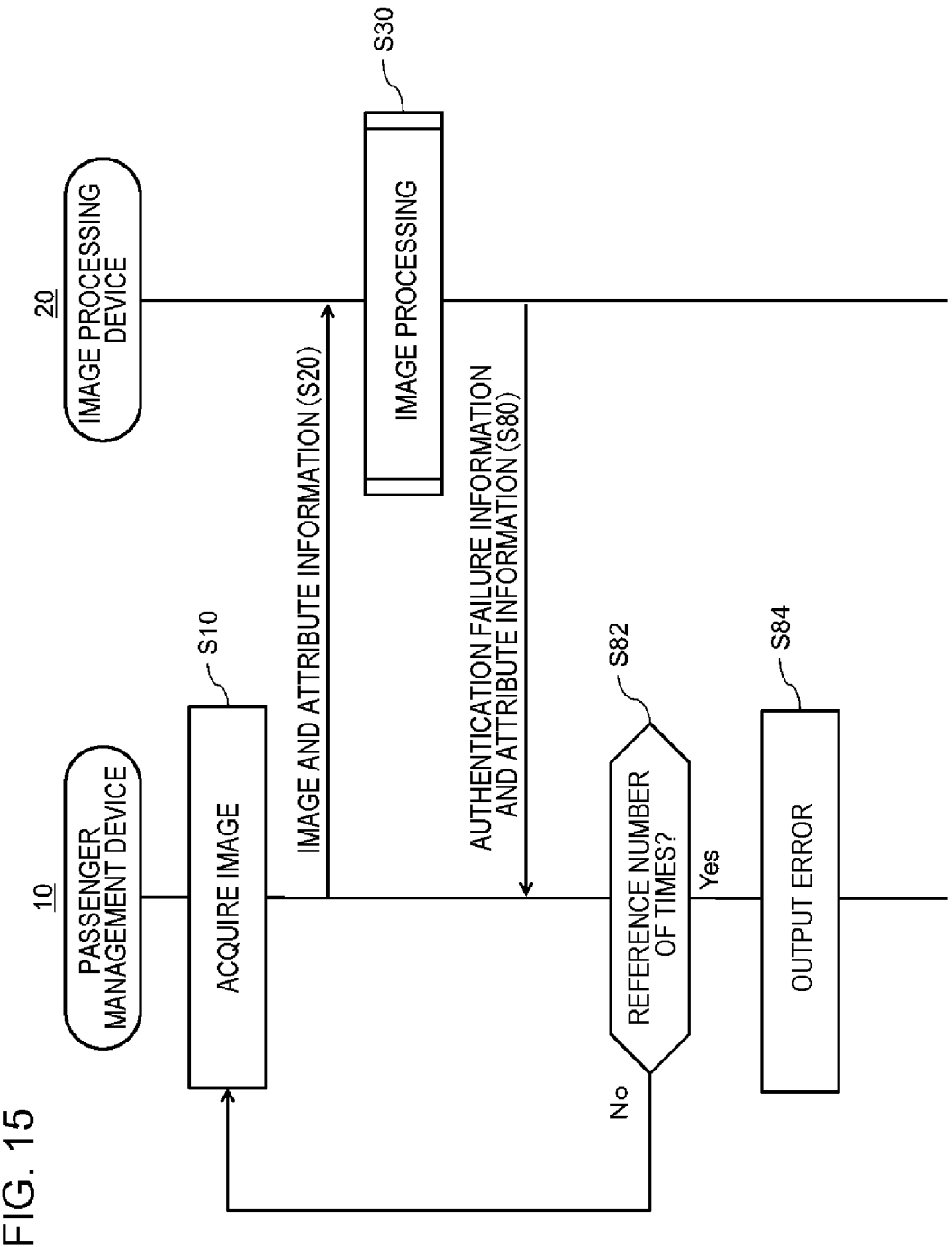
FIG. 15 is a flowchart showing operation examples of the passenger management device and the passenger information processing device when the passenger information processing device cannot authenticate a passenger.

FIG. 15 is a flowchart showing operation examples of the passenger management device and the passenger information processing device 20 when the passenger information processing device 20 cannot authenticate the passenger. The processing of steps S10 to S30 is same as described with reference to FIG. 7 in the first embodiment. However, in step S30, the image processing unit 220 of the passenger information processing device 20 cannot acquire the person specifying information of the passenger appearing in the image. Examples of such a case may include a case where the image is unclear and a case where the feature amount of the person extracted from the image does not match any of the feature amounts stored in the customer information storage unit 260.

With this, the transmission unit 230 of the passenger information processing device 20 transmits information indicating that the person specifying information cannot be acquired (hereinafter referred to as authentication failure information) to the passenger management device 10 together with attribute information of the image (for example, including seat information) (step S80).

The image transmission unit 110 counts the number of times that the authentication failure information is received for each of seat information. For the seat information for which the number of times does not exceed a reference value (step S82: No), the image transmission unit 110 transmits the image generated again by the first camera 40 corresponding to the seat information to the passenger information processing device 20. That is, the processing of steps S10 to S30 is repeated again for the seat information.

On the other hand, for the seat information for which the number of times the authentication failure information is received becomes the reference value (step S82: Yes), the image transmission unit 110 causes the crew output unit 190 to output the error information and the seat information (step S84). Here, the seat information preferably includes the seat number (including the vehicle number).

The terminal that receives the error information and the seat number outputs at least the seat number. For example, the terminal displays the seat number on a display. The crew who checks the output moves to the seat 322 indicated by the seat number and performs predetermined processing. Examples of this predetermined processing include performing settlement of the fare on the spot and giving advice to the passenger about a position of the face. The crew may manually switch the display of the display unit 330 as necessary.

The error information may be output to the display control unit 180. In this case, when receiving the error information, the display control unit 180 changes the display state of the display unit 330 corresponding to the seat number included in the error information to, for example, a third state different from the first and second states. In this manner, the passenger can recognize that the passenger management system fails the face authentication.

According to this embodiment, the same effect as that of the second embodiment can be also obtained. In a case where the passenger information processing device 20 fails to authenticate the passenger, the crew output unit 190 of the passenger management device 10 outputs the error information to notify the crew of the train 30 of the fact. Therefore, the crew can recognize that there is a passenger who cannot be authenticated and can perform a predetermined response.

Fourth Embodiment

<Functional Configuration Example>

Figure 16:
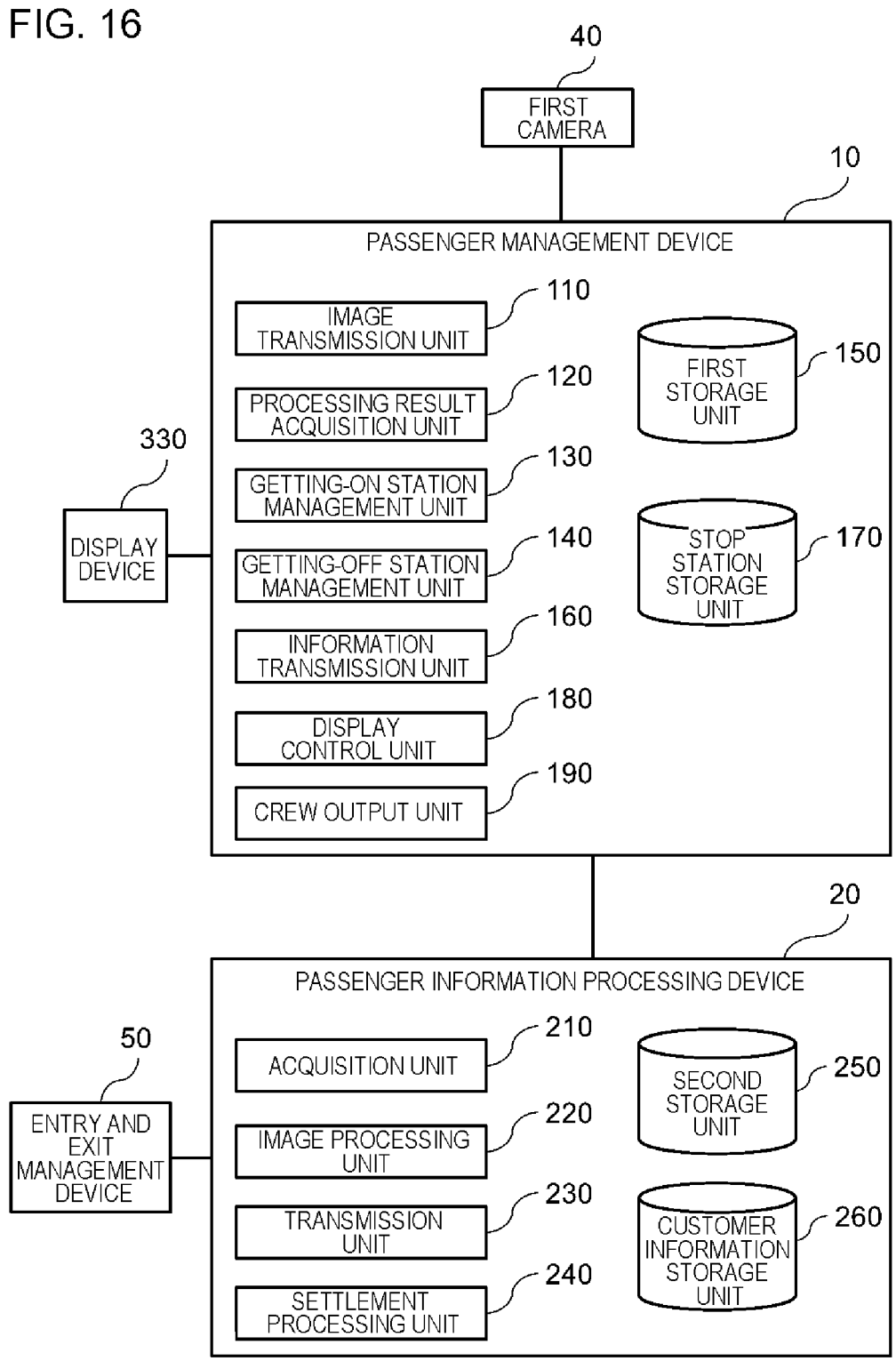
FIG. 16 is a diagram showing functional configurations of a passenger management device and a passenger information processing device according to a fourth embodiment.

FIG. 16 is a diagram showing functional configurations of the passenger management device 10 and the passenger information processing device 20 according to this embodiment. In a passenger management system according to this embodiment, the passenger information processing device 20 acquires information generated by an entry and exit management device 50.

The entry and exit management device 50 is a device that manages information generated by, for example, an automatic ticket gate and stores entry and exit information of the passenger together with the person specifying information of the passenger. The entry and exit information indicates, for example, whether or not the passenger is inside the ticket gate. For example, in a case where a passenger enters from the ticket gate of a first station, the entry and exit information corresponding to the passenger is "inside the ticket gate". Thereafter, in a case where the passenger exits from the ticket gate of a second station, the entry and exit information corresponding to the passenger is "outside the ticket gate".

The settlement processing unit 240 of the passenger information processing device 20 decides the timing of performing the settlement processing using the information acquired from the entry and exit management device 50. Specifically, the settlement processing unit 240 acquires from the entry and exit management device 50 that the entry and exit information of the passenger is switched from "inside the ticket gate" to "outside the ticket gate", and then performs the settlement processing on the use of the seat 322. The reason is that there may be a passenger who transfers between a plurality of trains 30.

FIG. 17 is a table showing an example of the information stored in the second storage unit 250 in this embodiment. FIG. 17 shows the information stored in association with one of person specifying information. The second storage unit 250 shown in FIG. 17 also stores the information acquired from the entry and exit management device 50. Specifically, the second storage unit 250 stores the getting on-and-off information of each of the trains 30 on which the passenger gets on for each of person specifying information. In the example shown in FIG. 17, the getting on-and-off information stores a getting-on date and time, a getting-off date and time, the seat information of the seat 322 seated by the passenger, the getting-on station, the getting-off station, and the above-described settlement information for each train 30.

Here, an example of a condition (transfer condition) for treating a passenger as a passenger who transferred between the plurality of trains 30 will be described.

In the example of FIG. 17, the passenger gets on the first train 30 from a station A to a station B. The passenger gets on the second train 30 from the station B on the same day and before the settlement for the use of the first train 30 is performed (that is, before getting out from the ticket gate). In such a case, the passenger should be treated as transferring from the first train 30 to the second train 30 at the station B. The settlement processing unit 240 settles an amount of money in a case where the passenger directly uses the trains from the getting-on station of the first train 30 (for example, the station A) to the getting-off station of the second train 30 (for example, a station C).

In the example shown in FIG. 17, a time between the timing when the passenger gets off the first train 30 at the station B and the timing when the passenger gets on the second train 30 at the same station B is short. The settlement processing unit 240 may further add a condition that the transfer time is short, for example, "a case where the transfer time between the two trains 30, that is, an interval between when the passenger gets off the first train 30 at a certain station and when the passenger gets on the second train 30 at the same station is within a reference time" to the condition for treating the passenger as transferring between the two trains 30 at the station B.

<Operation Example>

An operation of the passenger management system according to this embodiment is the same as that of any of the above-described embodiments except for the settlement processing (step S70 in FIG. 7) of the passenger information processing device 20.

Figure 18:
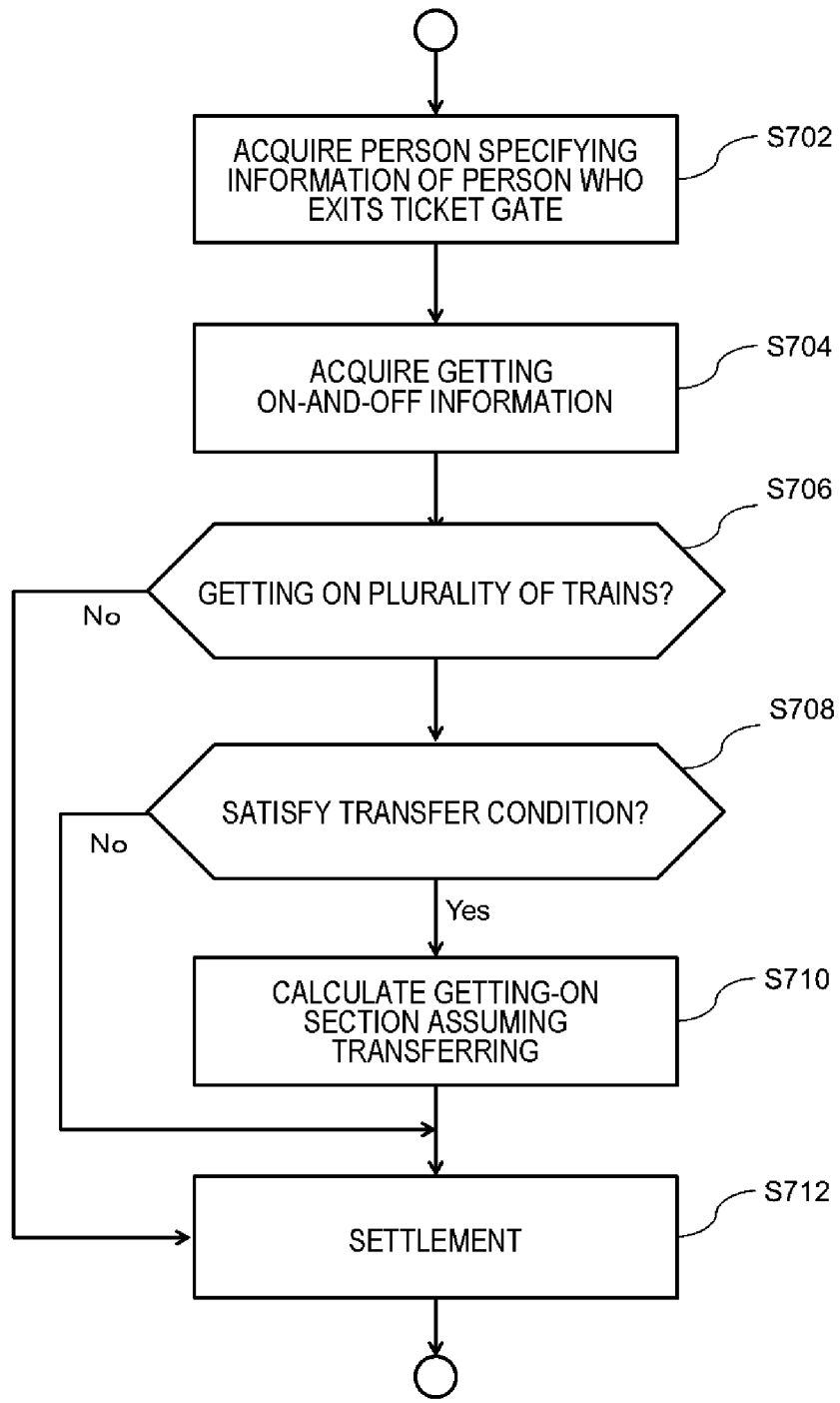
FIG. 18 is a flowchart showing a detailed example of step S70 in the fourth embodiment.

FIG. 18 is a flowchart showing a detailed example of step S70 in this embodiment. First, a passenger who uses the train 30 gets out from the ticket gate at any station. Here, when the passenger passes through the ticket gate, the ticket gate acquires the person specifying information of the passenger, for example, the customer ID and transmits the person specifying information to the entry and exit management device 50 together with an information that specifies a station on which the ticket gate is installed and an information (hereinafter referred to as exit information) indicating that the passenger exits the ticket gate. The entry and exit management device 50 transmits the person specifying information transmitted from the ticket gate to the passenger information processing device 20 together with the exit information.

A type of the person specifying information (for example, feature amount of face or customer ID) transmitted by the entry and exit management device 50 to the passenger information processing device 20 may be different from a type of the person specifying information acquired by the entry and exit management device 50 from the ticket gate. However, the person specifying information transmitted by the entry and exit management device 50 to the passenger information processing device 20 is the same as the type of the person specifying information stored in the second storage unit 250 of the passenger information processing device 20.

When the person specifying information is acquired from the entry and exit management device 50 (step S702), the settlement processing unit 240 of the passenger information processing device 20 acquires the getting on-and-off information corresponding to the person specifying information from the second storage unit 250 (step S704).

In a case where the getting on-and-off information of one train 30 is acquired from the second storage unit 250 (step S706: No), that is, in a case where the passenger uses one train 30, the settlement processing unit 240 settles a fare between the getting-on station and the getting-off station indicated by the getting on-and-off information (step S712). This fare may be calculated according to a distance of a use section.

On the other hand, in a case where the getting on-and-off information of the plurality of trains 30 is acquired from the second storage unit 250 (step S706: No), that is, the passenger uses the plurality of trains 30, the settlement processing unit 240 determines whether or not there is a combination of two trains 30 satisfying the transfer condition among the plurality of trains 30 (step S708). Example of the transfer condition is as described above with reference to FIG. 17.

Then, in a case where there is the combination of the trains 30 satisfying the transfer condition (step S708: Yes), the settlement processing unit 240 determines that a section between a getting-on station of an initial train 30 and a getting-off station of a last train 30 is the getting-on section of the passenger for the combination. Then, for the remaining trains 30, the settlement processing unit 240 treats each section between the getting-on station and the getting-off station indicated by the getting on-and-off information of each train 30 as an individual getting-on section (step S710).

On the other hand, in a case where there is no combination of the trains 30 satisfying the transfer condition (step S708: No), the settlement processing unit 240 treats each section between the getting-on station and the getting-off station indicated by the getting on-and-off information of each train 30 as an individual getting-on section.

The settlement processing unit 240 determines a fare for each getting-on section, adds these fares, and settles a fare after the addition (step S712).

In this embodiment, the settlement processing may be performed each time the passenger gets off the train 30. In this case, the settlement processing unit 240 calculates a difference in the amount of money caused by the transfer and executes the settlement processing for the difference in the amount of money at the timing of getting-off the train 30 after the transfer.

According to this embodiment, the same effect as that of the first embodiment can be also obtained. Furthermore, even in the case where the passenger transfers between the plurality of trains 30, the settlement processing unit 240 of the passenger information processing device 20 can settle the fare corresponding to the transfer.

Fifth Embodiment

A passenger management system according to this embodiment is the same as the passenger management system according to the fourth embodiment except for the following points.

The customer can register information (hereinafter scheduled getting-on section information) indicating a route or a getting-on section where the customer desires to receive service of the passenger management system, that is, a getting-on section or a route where the customer is likely to get on in the passenger information processing device 20. The passenger information processing device 20 performs the processing of each embodiment described above only in a case of the getting-on section or route satisfying the getting-on section information.

<Functional Configuration Example>

The functional configurations of the passenger management device 10 and the passenger information processing device 20 according to this embodiment are the same as any of the above-described embodiments except for a data configuration of the customer information storage unit 260.

FIG. 19 is a table showing an example of the data configuration of the customer information storage unit 260 according to this embodiment. In this embodiment, the scheduled getting-on section information is stored in the customer information storage unit 260 in association with the person specifying information. That is, in this embodiment, the customer information storage unit 260 also serves as an application section storage unit. As same with the above embodiments, the customer information storage unit 260 also stores the feature amount of the person and the settlement means information.

When an image is acquired, the acquisition unit 210 of the passenger information processing device 20 acquires train position information for specifying the position of the train at the time when the image is generated, in association with the image. The train position information may be, for example, date and time information when the image is generated, information that specifies the latest stop station of the train 30 stored in the stop station storage unit 170, or GPS information.

When the image processing unit 220 acquires the person specifying information by the image processing, the transmission unit 230 reads out the scheduled getting-on section information in correspondence with the person specifying information from the customer information storage unit 260. The transmission unit 230 transmits the person specifying information to passenger management device 10 in a case where the position indicated by the train position information is included in the scheduled getting-on section information, and transmits the authentication failure information in other cases.

The processing of the passenger management device 10 when the person specifying information is received and the processing of the passenger management device 10 when the authentication failure information is received are the same as those described in the fourth embodiment.

For example, in a case where a passenger uses the seat 322 in a section other than the scheduled getting-on section and authentication failure information is transmitted to the passenger management device 10, the error information is output to the terminal that can be used by the crew. The display control unit 180 changes the display on the display unit 330.

When the person specifying information is received, the display control unit 180 of the passenger management device 10 may further change the display state of the display unit 330 at a timing when the train approaches the last station of the scheduled getting-on section and cause the passenger to recognize the change.

According to this embodiment, the same effect as that of the fourth embodiment can be also obtained. Furthermore, the customer can register the route or the getting-on section where the customer desires to receive the service of the passenger management system in the passenger information processing device 20. Therefore, it is possible to suppress that a passenger uses the paid seat of the train 30 unintentionally.

Sixth Embodiment

<Functional Configuration Example>

Figure 20:
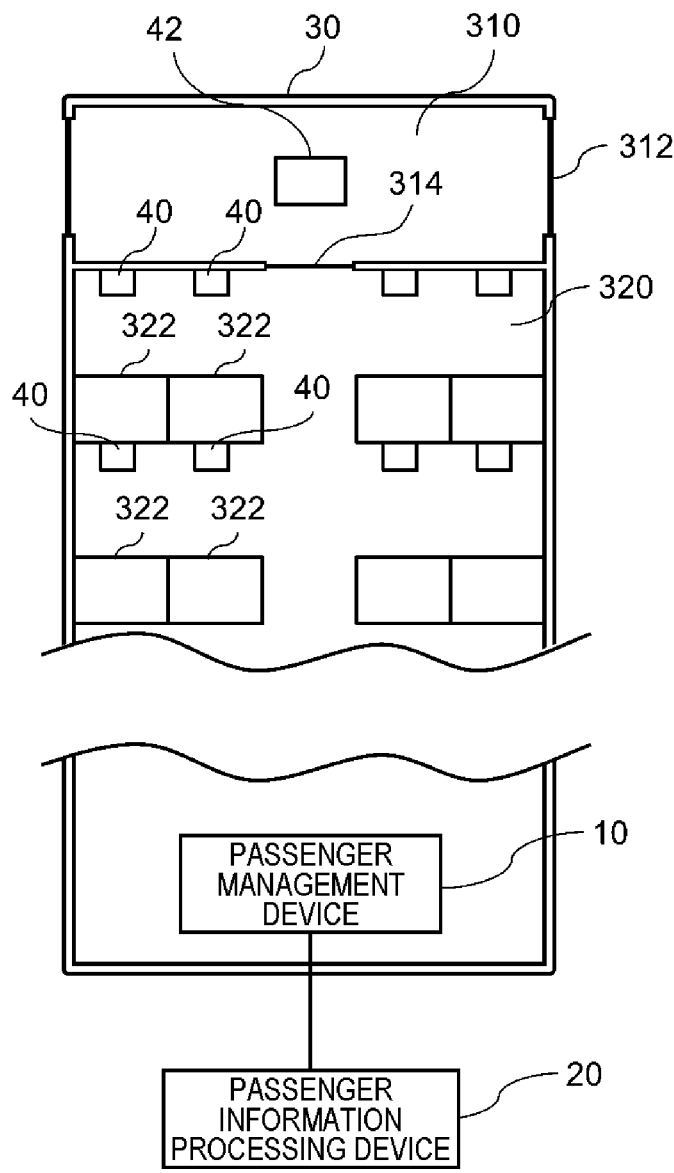
FIG. 20 is a diagram showing a configuration of a passenger management system according to a sixth embodiment.

FIG. 20 is a diagram showing a configuration of a passenger management system according to this embodiment. The passenger management system according to this embodiment has the same configuration as any of the above-described embodiments except that a second camera 42 is provided.

The second camera 42 is provided on the deck of the train 30 and can image a person passing through the entrance 312 of the train 30, that is, both a passenger who gets on the train and a passenger who gets off the train 30. A layout of the second camera 42 is not limited to the example shown in the passenger information processing device 20.

The passenger management device 10 transmits the image generated by the first camera to the passenger information processing device 20, and transmits an image generated by the second camera 42 at least while the train 30 stops at the station to the passenger information processing device 20. The passenger information processing device 20 includes information that specifies a camera that generates a processed image (that is, includes distinction between the first camera 40 and the second camera 42) and information indicating a movement direction of the person (that is, information indicating whether the passenger gets on or off), in the attribute information associated with the person specifying information. The image processing unit 220 of the passenger information processing device 20 generates the information indicating the movement direction of the person based on, for example, whether or not a face appears when the passenger passes through the entrance 312.

The getting-on station management unit 130 of the passenger management device 10 uses the image generated by the first camera 40 to specify the seat 322 where the passenger seats. The getting-on station management unit 130 uses the image generated by the second camera 42 to generate getting-on station information and getting-off station information of the passenger.

According to this embodiment, the same effects as those of each embodiment described above can be also obtained.

This embodiments of the invention are described with reference to the drawings. However, this embodiments are only examples of the invention, and various configurations other than the above can be employed.

In the plurality of flowcharts used in the above description, the plurality of steps (processing) are described in order. However, the execution order of the steps executed in each embodiment is not limited to the order of the description. In each embodiment, the order of the illustrated steps can be changed within the scope of the contents. Each of this embodiments described above can be combined within the scope in which the contents do not contradict each other.

Some or all of the above embodiments may be described as in the following additions, but are not limited to the followings.

1. A passenger management device installed in a train including:
   an image transmission unit that transmits information on at least a portion including a person of a plurality of images generated by at least one imaging unit installed in the train and generated at different timings to a passenger information processing device that performs person specifying processing;
   a processing result acquisition unit that acquires person specifying information which is a processing result of each of the plurality of images by the passenger information processing device and that specifies the person included in the image in association with attribute information for specifying a position of the person and a time point;
   a getting-on station management unit that causes a first storage unit to store getting-on station information that specifies a getting-on station of the person in association with the person specifying information of the person using the person specifying information and the attribute information associated with the person specifying information; and
   a getting-off station management unit that causes the first storage unit to store getting-off station information that specifies a getting-off station of the person in association with the person specifying information of the person using the person specifying information and the attribute information associated with the person specifying information.

2. The passenger management device according to 1,
   wherein the first storage unit is installed in the train,
   the passenger management device further including:
   an information transmission unit that transmits the person specifying information associated with the getting-off station information and the getting-on station information and the getting-off station information associated with the person specifying information in the first storage unit to a second storage unit outside the train for storage.

3. The passenger management device according to 2,
   wherein information stored in the second storage unit is used for settlement processing.

4. The passenger management device according to any one of 1 to 3,
   wherein the attribute information includes seat information for specifying a seat on which the person is seated, and
   wherein the getting-on station management unit causes the first storage unit to store a combination of the person specifying information and seat information indicating the seat specified by the attribute information.

5. The passenger management device according to 4,
   wherein the train is provided with a display unit that indicates whether or not the seat is in use,
   the passenger management device further including:
   a display control unit that controls the display unit using the attribute information.

6. The passenger management device according to 4 or 5, further including:
   a crew output unit that performs a predetermined output to a terminal that is usable by a crew of the train in a case where the processing result acquisition unit acquires the attribute information but does not acquire the person specifying information.

7. The passenger management device according to any one of 1 to 6,
   wherein the at least one imaging unit repeatedly generates the image, and
   wherein the image transmission unit transmits the image to the passenger information processing device each time the image is generated.

8. The passenger management device according to 7,
   wherein the attribute information includes the seat information for specifying the seat on which the person is seated, and
   wherein the getting-on station management unit updates the seat information stored in the first storage unit to newly acquired seat information in a case where the seat information specified by the newly acquired attribute information is different from the seat information stored in the first storage unit in correspondence with the person specifying information associated with the attribute information.

9. The passenger management device according to 7 or 8,
   wherein the train has a stop station storage unit that stores the latest stop station of the train, and
   wherein the getting-off station management unit sets the getting-off station corresponding to at least one piece of person specifying information to the latest stop station stored in the stop station storage unit in a case where person specifying information newly acquired by the processing result acquisition unit does not include the at least one piece of person specifying information already stored in the first storage unit.

10. The passenger management device according to 7 or 8,
    wherein the getting-off station management unit causes the first storage unit to store a station as a temporary getting-off station in association with the already stored person specifying information each time the train stops at the station, and sets the temporary getting-off station stored in the first storage unit in correspondence with the person specifying information as an official get-off station in a case where the person specifying information newly acquired by the processing result acquisition unit does not include the already stored person specifying information after the train departs from the station.

11. A passenger information processing device including:
    an acquisition unit that acquires information on a portion including at least a person of a plurality of images generated by at least one imaging unit installed in the train and generated at different timings;
    an image processing unit that acquires person specifying information of a person who gets on the train using a feature amount of a person included in the image; and
    a transmission unit that transmits the person specifying information acquired by the image processing unit to a passenger management device installed in the train,
    wherein the acquisition unit acquires getting on-and-off information indicating a getting-on station and a getting-off station of the person indicated by the person specifying information in association with the person specifying information from the passenger management device, the passenger information processing device further including:

a settlement processing unit that performs settlement processing on a fare for the train using the getting on-and-off information and the person specifying information.

12. The passenger information processing device according to 11, wherein at least one of conditions for performing the settlement processing is to acquire exit information indicating that the person leaves a ticket gate of any station in association with the person specifying information of the person.

13. The passenger information processing device according to 11 or 12, wherein the acquisition unit acquires train position information for specifying a position of the train when the image is generated, in association with the image, wherein the transmission unit is able to communicate with an application section storage unit that stores scheduled getting-on section information indicating a getting-on section or a route in which the person is likely to get on, in correspondence with the person specifying information of the person, and wherein in a case where the train position information is included in the getting-on section or the route indicated by the scheduled getting-on section information, the transmission unit transmits the person specifying information to the passenger management device.

14. A passenger management method causing a computer installed in a train to perform transmitting information on at least a portion including a person of a plurality of images generated by at least one imaging unit installed in the train and generated at different timings to a passenger information processing device that performs person specifying processing;

acquiring person specifying information which is a processing result of each of the plurality of images by the passenger information processing device and that specifies the person included in the image in association with attribute information for specifying a position of the person and a time point;

causing a first storage unit to store getting-on station information that specifies a getting-on station of the person in association with the person specifying information of the person using the person specifying information and the attribute information associated with the person specifying information; and causing the first storage unit to store getting-off station information that specifies a getting-off station of the person in association with the person specifying information of the person using the person specifying information and the attribute information associated with the person specifying information.

15. The passenger management method according to 14, wherein the first storage unit is installed in the train, the passenger management method further including:

an information transmission unit that transmits the person specifying information associated with the getting-off station information and the getting-on station information and the getting-off station information associated with the person specifying information in the first storage unit to a second storage unit outside the train for storage.

16. The passenger management method according to 15, wherein information stored in the second storage unit is used for settlement processing.

17. The passenger management method according to any one of 14 to 16, wherein the attribute information includes seat information for specifying a seat on which the person is seated, and wherein the getting-on station management unit causes the first storage unit to store a combination of the person specifying information and seat information indicating the seat specified by the attribute information.

18. The passenger management method according to 17, wherein the train is provided with a display unit that indicates whether or not the seat is in use, the passenger management method further including:

a display control unit that controls the display unit using the attribute information.

19. The passenger management method according to 17 or 18, further including:

a crew output unit that performs a predetermined output to a terminal that is usable by a crew of the train in a case where the processing result acquisition unit acquires the attribute information but does not acquire the person specifying information.

20. The passenger management method according to any one of 14 to 19, wherein the at least one imaging unit repeatedly generates the image, and wherein the image transmission unit transmits the image to the passenger information processing device each time the image is generated.

21. The passenger management method according to 20, wherein the attribute information includes the seat information for specifying the seat on which the person is seated, and wherein the getting-on station management unit updates the seat information stored in the first storage unit to newly acquired seat information in a case where the seat information specified by the newly acquired attribute information is different from the seat information stored in the first storage unit in correspondence with the person specifying information associated with the attribute information.

22. The passenger management method according to 20 or 21, wherein the train has a stop station storage unit that stores the latest stop station of the train, and wherein the getting-off station management unit sets the getting-off station corresponding to at least one piece of person specifying information to the latest stop station stored in the stop station storage unit in a case where person specifying information newly acquired by the processing result acquisition unit does not include the at least one piece of person specifying information already stored in the first storage unit.

23. The passenger management method according to 20 or 21, wherein the getting-off station management unit causes the first storage unit to store a station as a temporary getting-off station in association with the already stored person specifying information each time the train stops at the station, and sets the temporary getting-off station stored in the first storage unit in correspondence with the person specifying information as an official get-off station in a case where the person specifying information newly acquired by the processing result acquisition unit does not include the already stored person specifying information after the train departs from the station.

24. A passenger management method causing a computer to perform acquiring information on at least a portion including a person of a plurality of images generated by at least one imaging unit installed in the train and generated at different timings;

acquiring person specifying information of a person who gets on the train using a feature amount of a person included in the image;

transmitting the acquired person specifying information to a passenger management device installed in the train;

acquiring getting on-and-off information indicating a getting-on station and a getting-off station of the person indicated by the person specifying information in association with the person specifying information from the passenger management device; and performing settlement processing on a fare for the train using the getting on-and-off information and the person specifying information.

25. The passenger management method according to 24, wherein at least one of conditions for performing the settlement processing is to acquire exit information indicating that the person leaves a ticket gate of any station in association with the person specifying information of the person.

26. The passenger management method according to 24 or 25, wherein the acquisition unit acquires train position information for specifying a position of the train when the image is generated, in association with the image, wherein the transmission unit is able to communicate with an application section storage unit that stores scheduled getting-on section information indicating a getting-on section or a route in which the person is likely to get on, in correspondence with the person specifying information of the person, and wherein in a case where the train position information is included in the getting-on section or the route indicated by the scheduled getting-on section information, the person specifying information is transmitted to the passenger management device.

27. A program causing a computer installed in a train to perform a function of transmitting information on at least a portion including a person of a plurality of images generated by at least one imaging unit installed in the train and generated at different timings to a passenger information processing device that performs person specifying processing;

a function of acquiring person specifying information which is a processing result of each of the plurality of images by the passenger information processing device and that specifies the person included in the image in association with attribute information for specifying a position of the person and a time point;

a function of causing a first storage unit to store getting-on station information that specifies a getting-on station of the person in association with the person specifying information of the person using the person specifying information and the attribute information associated with the person specifying information; and a function of causing the first storage unit to store getting-off station information that specifies a getting-off station of the person in association with the person specifying information of the person using the person specifying information and the attribute information associated with the person specifying information.

28. The program according to 27, wherein the first storage unit is installed in the train, the program further including:

an information transmission unit that transmits the person specifying information associated with the getting-off station information and the getting-on station information and the getting-off station information associated with the person specifying information in the first storage unit to a second storage unit outside the train for storage.

29. The program according to 28, wherein information stored in the second storage unit is used for settlement processing.

30. The program according to any one of 27 to 29, wherein the attribute information includes seat information for specifying a seat on which the person is seated, and wherein the getting-on station management unit causes the first storage unit to store a combination of the person specifying information and seat information indicating the seat specified by the attribute information.

31. The program according to 30, wherein the train is provided with a display unit that indicates whether or not the seat is in use, the program further including:

a display control unit that controls the display unit using the attribute information.

32. The program according to 30 or 31, further including:

a crew output unit that performs a predetermined output to a terminal that is usable by a crew of the train in a case where the processing result acquisition unit acquires the attribute information but does not acquire the person specifying information.

33. The program according to any one of 27 to 32, wherein the at least one imaging unit repeatedly generates the image, and wherein the image transmission unit transmits the image to the passenger information processing device each time the image is generated.

34. The program according to 33, wherein the attribute information includes the seat information for specifying the seat on which the person is seated, and wherein the getting-on station management unit updates the seat information stored in the first storage unit to newly acquired seat information in a case where the seat information specified by the newly acquired attribute information is different from the seat information stored in the first storage unit in correspondence with the person specifying information associated with the attribute information.

35. The program according to 33 or 34, wherein the train has a stop station storage unit that stores the latest stop station of the train, and wherein the getting-off station management unit sets the getting-off station corresponding to at least one piece of person specifying information to the latest stop station stored in the stop station storage unit in a case where person specifying information newly acquired by the processing result acquisition unit does not include the at least one piece of person specifying information already stored in the first storage unit.

36. The program according to 33 or 34, wherein the getting-off station management unit causes the first storage unit to store a station as a temporary getting-off station in association with the already stored person specifying information each time the train stops at the station, and sets the temporary getting-off station stored in the first storage unit in correspondence with the person specifying information as an official get-off station in a case where the person specifying information newly acquired by the processing result acquisition unit does not include the already stored person specifying information after the train departs from the station.

37. A program causing a computer to perform a function of acquiring information on at least a portion including a person of a plurality of images generated by at least one imaging unit installed in the train and generated at different timings;

a function of acquiring person specifying information of a person who gets on the train using a feature amount of a person included in the image;

a function of transmitting the acquired person specifying information to a passenger management device installed in the train;

a function of acquiring getting on-and-off information indicating a getting-on station and a getting-off station of the person indicated by the person specifying information in association with the person specifying information from the passenger management device; and a function of performing settlement processing on a fare for the train using the getting on-and-off information and the person specifying information.

38. The program according to 37, wherein at least one of conditions for performing the settlement processing is to acquire exit information indicating that the person leaves a ticket gate of any station in association with the person specifying information of the person.

39. The program according to 37 or 38, wherein the acquisition unit acquires train position information for specifying a position of the train when the image is generated, in association with the image, wherein the transmission unit is able to communicate with an application section storage unit that stores scheduled getting-on section information indicating a getting-on section or a route in which the person is likely to get on, in correspondence with the person specifying information of the person, and wherein in a case where the train position information is included in the getting-on section or the route indicated by the scheduled getting-on section information, the person specifying information is transmitted to the passenger management device.

It is apparent that the present invention is not limited to the above embodiment, and may be modified and changed without departing from the scope and spirit of the invention.

What is claimed is:

1. A passenger management device installed in a train comprising:

a processor; and a memory storing executable instructions that, when executed by the processor, causes the processor to perform as:

an image transmission unit that transmits information on at least a portion including a person of a plurality of images generated by at least one camera installed in the train and generated at different timings to a passenger information processing device that performs person specifying processing;

a processing result acquisition unit that acquires person specifying information which is a processing result of each of the plurality of images by the passenger information processing device and that specifies the person included in the image in association with attribute information which for specifying a position of the person and a time point;

a getting-on station management unit that causes a first storage to store getting-on station information that specifies a getting-on station of the person in association with the person specifying information of the person using the person specifying information and the attribute information associated with the person specifying information; and a getting-off station management unit that causes the first storage to store getting-off station information that specifies a getting-off station of the person in association with the person specifying information of the person using the person specifying information and the attribute information associated with the person specifying information.

2. The passenger management device according to claim 1, wherein the first storage is installed in the train, the passenger management device processor further performs as:

an information transmission unit that transmits the person specifying information associated with the getting-off station information, and the getting-on station information and the getting-off station information associated with the person specifying information in the first storage, to a second storage outside the train for storage.

3. The passenger management device according to claim 2, wherein information stored in the second storage is used for settlement processing.

4. The passenger management device according claim 1, wherein the attribute information includes seat information for specifying a seat on which the person is seated, and wherein the getting-on station management unit causes the first storage to store a combination of the person specifying information and seat information indicating the seat specified by the attribute information.

5. The passenger management device according to claim 4, wherein the train comprises a display that indicates whether or not the seat is in use, the passenger management device processor further performs as:

a display control unit that controls the display using the attribute information.

6. The passenger management device according to claim 4, wherein the processor further performs as:

a crew output unit that performs a predetermined output to a terminal that is usable by a crew of the train in a case where the processing result acquisition unit acquires the attribute information but does not acquire the person specifying information.

7. The passenger management device according to claim 1, wherein the at least one camera repeatedly generates the image, and wherein the image transmission unit transmits the image to the passenger information processing device each time the image is generated.

8. The passenger management device according to claim 7, wherein the attribute information includes the seat information for specifying the seat on which the person is seated, and wherein the getting-on station management unit updates the seat information stored in the first storage to newly acquired seat information in a case where the seat information specified by the newly acquired attribute information is different from the seat information stored in the first storage in correspondence with the person specifying information associated with the attribute information.

9. The passenger management device according to claim 7,
wherein the train has a stop station storage that stores the latest stop station of the train, and
wherein the getting-off station management unit sets the getting-off station corresponding to at least one of person specifying information to the latest stop station stored in the stop station storage in a case where person specifying information newly acquired by the processing result acquisition unit does not include the at least one of person specifying information already stored in the first storage.

10. The passenger management device according to claim 7,
wherein the getting-off station management unit causes the first storage to store a station as a temporary getting-off station in association with the already stored person specifying information each time the train stops at the station, and sets the temporary getting-off station stored in the first storage in correspondence with the person specifying information as an official get-off station in a case where the person specifying information newly acquired by the processing result acquisition unit does not include the already stored person specifying information after the train departs from the station.

11. A passenger information processing device comprising:
a processor; and
a memory storing executable instructions that, when executed by the processor, causes the processor to perform as:
an acquisition unit that acquires information on at least a portion including a person of a plurality of images generated by at least one camera installed in the train and generated at different timings;
an image processing unit that acquires person specifying information of a person who gets on the train using a feature amount of a person included in the image; and
a transmission unit that transmits the person specifying information acquired by the image processing unit to a passenger management device installed in the train,
wherein the acquisition unit acquires getting on-and-off information indicating a getting-on station and a getting-off station of the person indicated by the person specifying information in association with the person specifying information from the passenger management device,
the passenger information processing device processor further performs as:
a settlement processing unit that performs settlement processing on a fare for the train using the getting on-and-off information and the person specifying information.

12. The passenger information processing device according to claim 11,
wherein at least one of conditions for performing the settlement processing is to acquire exit information indicating that the person gets out from a ticket gate of any station in association with the person specifying information of the person.

13. The passenger information processing device according to claim 11,
wherein the acquisition unit acquires train position information for specifying a position of the train when the image is generated, in association with the image,
wherein the transmission unit is able to communicate with an application section storage that stores scheduled getting-on section information indicating a getting-on section or a route in which the person is likely to get on, in correspondence with the person specifying information of the person, and
wherein in a case where the train position information is included in the getting-on section or the route indicated by the scheduled getting-on section information, the transmission unit transmits the person specifying information to the passenger management device.

14. A passenger management method causing a computer installed in a train to perform
transmitting information on at least a portion including a person of a plurality of images generated by at least one camera installed in the train and generated at different timings to a passenger information processing device that performs person specifying processing;
acquiring person specifying information which is a processing result of each of the plurality of images by the passenger information processing device and that specifies the person included in the image in association with attribute information which can specify a position of the person and a time point;
causing a first storage to store getting-on station information that specifies a getting-on station of the person in association with the person specifying information of the person using the person specifying information and the attribute information associated with the person specifying information; and
causing the first storage to store getting-off station information that specifies a getting-off station of the person in association with the person specifying information of the person using the person specifying information and the attribute information associated with the person specifying information.

15. A passenger management method causing a computer to perform
acquiring information on at least a portion including a person of a plurality of images generated by at least one camera installed in the train and generated at different timings;
acquiring person specifying information of a person who gets on the train using a feature amount of a person included in the image;
transmitting the acquired person specifying information to a passenger management device installed in the train;
acquiring getting on-and-off information indicating a getting-on station and a getting-off station of the person indicated by the person specifying information in association with the person specifying information from the passenger management device; and
performing settlement processing on a fare for the train using the getting on-and-off information and the person specifying information.

16. A non-transitory storage medium storing a program causing a computer installed in a train to perform
a function of transmitting information on at least a portion including a person of a plurality of images generated by at least one camera installed in the train and generated at different timings to a passenger information processing device that performs person specifying processing;

a function of acquiring person specifying information which is a processing result of each of the plurality of images by the passenger information processing device and that specifies the person included in the image in association with attribute information for specifying a position of the person and a time point;

a function of causing a first storage to store getting-on station information that specifies a getting-on station of the person in association with the person specifying information of the person using the person specifying information and the attribute information associated with the person specifying information; and a function of causing the first storage to store getting-off station information that specifies a getting-off station of the person in association with the person specifying information of the person using the person specifying information and the attribute information associated with the person specifying information.

17. A non-transitory storage medium storing a program causing a computer to perform a function of acquiring information on at least a portion including a person of a plurality of images generated by at least one camera installed in the train and generated at different timings;

a function of acquiring person specifying information of a person who gets on the train using a feature amount of a person included in the image;

a function of transmitting the acquired person specifying information to a passenger management device installed in the train;

a function of acquiring getting on-and-off information indicating a getting-on station and a getting-off station of the person indicated by the person specifying information in association with the person specifying information from the passenger management device; and a function of performing settlement processing on a fare for the train using the getting on-and-off information and the person specifying information.

* * * * *